(12) United States Patent
Pouchak et al.

(10) Patent No.: US 8,418,128 B2
(45) Date of Patent: Apr. 9, 2013

(54) GRAPHICAL LANGUAGE COMPILER SYSTEM

(75) Inventors: Michael A. Pouchak, Saint Anthony, MN (US); Gary A. Smith, Plymouth, MN (US)

(73) Assignee: Honeywell International Inc., Morristown, NJ (US)

( * ) Notice: Subject to any disclaimer, the term of this patent is extended or adjusted under 35 U.S.C. 154(b) by 1653 days.

(21) Appl. No.: 11/777,873

(22) Filed: Jul. 13, 2007

(65) Prior Publication Data

US 2008/0010049 A1 Jan. 10, 2008

Related U.S. Application Data

(63) Continuation-in-part of application No. 11/427,750, filed on Jun. 29, 2006, now Pat. No. 7,826,929, and a continuation-in-part of application No. 11/670,911, filed on Feb. 2, 2007, now Pat. No. 8,112,162, and a continuation-in-part of application No. 11/620,431, filed on Jan. 5, 2007, now Pat. No. 7,653,459, and a continuation-in-part of application No. 11/564,797, filed on Nov. 29, 2006, now Pat. No. 8,224,466.

(51) Int. Cl.
   *G06F 9/44* (2006.01)

(52) U.S. Cl.
   USPC .............. 717/105; 717/109; 717/113

(58) Field of Classification Search .............. None
   See application file for complete search history.

(56) References Cited

U.S. PATENT DOCUMENTS

| | | | |
|---|---|---|---|
| 4,654,653 A | 3/1987 | Brindle et al. | |
| 4,723,513 A | 2/1988 | Vallett et al. | |
| 4,784,580 A | 11/1988 | Takata et al. | |
| 4,793,800 A | 12/1988 | Vallett et al. | |
| 5,449,319 A | 9/1995 | Dushane et al. | |
| 5,479,812 A | 1/1996 | Juntunen et al. | |
| 5,605,280 A | 2/1997 | Hartman | |
| 5,778,368 A | 7/1998 | Hogan et al. | |
| 5,989,020 A | 11/1999 | Glass et al. | |
| 6,008,805 A | 12/1999 | Land et al. | |
| 6,041,178 A * | 3/2000 | Rybarczyk et al. | 717/109 |
| 6,173,438 B1 * | 1/2001 | Kodosky et al. | 717/109 |
| 6,272,400 B1 | 8/2001 | Jankins et al. | |
| 6,311,149 B1 * | 10/2001 | Ryan et al. | 703/21 |
| 6,330,806 B1 | 12/2001 | Beaverson et al. | |
| 6,428,312 B1 | 8/2002 | Smelcer et al. | |
| 6,453,687 B2 | 9/2002 | Sharood et al. | |

(Continued)

OTHER PUBLICATIONS

Egger et al.Formal Specification of a Safe PLC Language and its Compiler.Proceedings of the SafeComp, 1994, pp. 1-10, Retrieved on [Nov. 14, 2012] Retrieved from the Internet: URL<http://scholar.google.com/scholar?cluster=16233743087286722003&hl=en&as_sdt=0,47>.*

(Continued)

*Primary Examiner* — Thuy Dao
*Assistant Examiner* — Cheneca Smith
(74) *Attorney, Agent, or Firm* — Seager Tufte & Wickhem LLC.

(57) ABSTRACT

A system having a graphical compiler connected to a function block engine. The graphical compiler may convert graphical information to non-graphical information. A resources allocation module may be connected to the function block engine and the compiler. Also, a function block execution list may be connected to the compiler and the function block engine. A user interface may be connected to the compiler.

19 Claims, 32 Drawing Sheets

U.S. PATENT DOCUMENTS

| | | | |
|---|---|---|---|
| 6,536,678 B2 | 3/2003 | Pouchak | |
| 6,549,826 B1 | 4/2003 | Pouchak et al. | |
| 6,564,368 B1* | 5/2003 | Beckett et al. | 717/113 |
| 6,615,404 B1 | 9/2003 | Garfunkel et al. | |
| 6,619,951 B2 | 9/2003 | Bodnar et al. | |
| 6,694,926 B2 | 2/2004 | Baese et al. | |
| 6,738,964 B1* | 5/2004 | Zink et al. | 717/113 |
| 6,745,085 B2 | 6/2004 | Pouchak | |
| 6,832,120 B1 | 12/2004 | Frank et al. | |
| 6,934,862 B2 | 8/2005 | Sharood et al. | |
| 7,120,908 B1 | 10/2006 | Klimchynski | |
| 7,124,163 B2 | 10/2006 | Geofroy et al. | |
| 7,203,931 B2* | 4/2007 | Minamide et al. | 700/18 |
| 7,225,037 B2* | 5/2007 | Shani | 700/18 |
| 7,290,244 B2* | 10/2007 | Peck et al. | 717/109 |
| 7,484,200 B2* | 1/2009 | Joffrain et al. | 717/100 |
| 7,530,052 B2* | 5/2009 | Morrow et al. | 717/113 |
| 7,743,362 B2* | 6/2010 | Peck et al. | 717/109 |
| 8,015,542 B1* | 9/2011 | Parthasarathy et al. | 717/105 |
| 2002/0004804 A1* | 1/2002 | Muenzel | 707/513 |
| 2003/0100958 A1* | 5/2003 | Cachat et al. | 700/18 |
| 2003/0158975 A1 | 8/2003 | Frank et al. | |
| 2003/0159129 A1 | 8/2003 | Frank et al. | |
| 2004/0144849 A1 | 7/2004 | Ahmed | |
| 2004/0235384 A1* | 11/2004 | Reich et al. | 445/24 |
| 2004/0238653 A1 | 12/2004 | Alles | |
| 2005/0102651 A1* | 5/2005 | Ueda | 717/109 |
| 2005/0155015 A1* | 7/2005 | Novacek | 717/105 |
| 2005/0230490 A1 | 10/2005 | Pouchak et al. | |
| 2005/0251789 A1* | 11/2005 | Peck et al. | 717/113 |
| 2006/0036798 A1* | 2/2006 | Dickey et al. | 711/100 |
| 2006/0253835 A1* | 11/2006 | Saelens | 717/108 |
| 2007/0261019 A1* | 11/2007 | Raghavan et al. | 717/105 |

OTHER PUBLICATIONS

Berry et al.System Level Design and Verification Using a Synchronous Language, Proceedings of the 2003 IEEE/ACM international conference on Computer-aided design, 2003 pp. 433-439, Retrieved on [Nov. 14, 2012] Retrieved from the Internet: URL<http://dl.acm.org/citation.cfm?id=1009926>.*

Echelon, "ShortStack Developer's Kit Model 23400," 3 pages, 2002.

Echelon, "Echelon ShortStack Micro Server Answers to Frequently Asked Questions," pp. 1-5, Apr. 2002.

Echelon, "ShortStack Overview," 12 pages, prior to Nov. 29, 2006.

Echelon, "ShortStack User's Guide, Version 2" 152 pages, Mar. 2002.

Honeywell, "T7770 A,B,C,D,E,F,G, Wall Modules, Excel 5000 Open System," pp. 1-4, 1997.

"LonMark Functional Profile: VAV Controller (VAV)," pp. 1-19, 1996.

* cited by examiner

| SimTime | ADD1.y | nviIn3. | Tag1_4. | LIMIT8.y | LIMIT12.y | SQRT8.y | MUL10.y |
|---|---|---|---|---|---|---|---|
| 11 | 17 | 2 | 17 | 10 | 17 | 4.123106 | 8 |
| 21 | 27 | 2 | 27 | 20 | 27 | 5.196152 | 8 |
| 31 | 37 | 2 | 37 | 30 | 37 | 6.082763 | 8 |
| 41 | 47 | 2 | 40 | 40 | 40 | 6.324555 | 8 |
| 51 | 57 | 2 | 40 | 50 | 40 | 6.324555 | 8 |
| 101 | 63 | 2 | 40 | 5 | 40 | 6.324555 | 8 |
| 111 | 17 | 2 | 17 | 10 | 17 | 4.123106 | 8 |
| 121 | 27 | 2 | 27 | 20 | 27 | 5.196152 | 8 |
| 131 | 37 | 2 | 37 | 30 | 37 | 6.082763 | 8 |
| 141 | 47 | 2 | 40 | 40 | 40 | 6.324555 | 8 |
| 151 | 57 | 2 | 40 | 50 | 40 | 6.324555 | 8 |
| 201 | 63 | 2 | 40 | 5 | 40 | 6.324555 | 8 |
| 211 | 17 | 2 | 17 | 10 | 17 | 4.123106 | 8 |
| 221 | 27 | 2 | 27 | 20 | 27 | 5.196152 | 8 |
| 231 | 37 | 2 | 37 | 30 | 37 | 6.082763 | 8 |
| 241 | 47 | 2 | 40 | 40 | 40 | 6.324555 | 8 |

| | A | B | C | D | E | F | G | H | I | J | K | L | M | N | O | P | Q | R | S | T |
|---|---|---|---|---|---|---|---|---|---|---|---|---|---|---|---|---|---|---|---|---|
| 1 | Device Nan | VAVModReheat3 | | | | | | | | | | | | | | | | | | |
| 2 | LoopType | FBName | WrdParamVal(0) | WrdP | WrdP | WrdF | WrdPar | Wrd | Wrd | Wrd | WrdF | WrdParamIO(0) | Wrc | Wrd | Wrd | Wrd | WrdF | WrdF | Wrd | Wrd |
| 3 | 130 | | 0 | 0 | 0 | 0 | 0 | 0 | 0 | 0 | 0 | | 6 | 6 | 5 | 5 | 5 | 6 | 5 | 0 |
| 4 | | | | | | | | | | | | | | | | | | | | |
| 5 | 18 | OCC_ARB | 0 | 0 | 0 | 0 | 0 | 0 | 0 | 0 | 0 | | 6 | 6 | 5 | 5 | 6 | 6 | 5 | 6 |
| 6 | 41 | TEMP_SPCALC | 0 | 0 | 0 | 0 | 0 | 0 | 0 | 0 | 0 | | 1 | 1 | 1 | 1 | 1 | 1 | 1 | 5 |
| 7 | 19 | TEMP_MODE | 0 | 0 | 0 | 0 | 0 | 0 | 0 | 0 | 0 | | 1 | 1 | 1 | 1 | 1 | 1 | 1 | 6 |
| 8 | 253 | | 0 | 0 | 0 | 0 | 0 | 0 | 0 | 0 | 0 | 10 | 10 | 0 | 0 | 0 | 0 | 0 | 0 | 0 |
| 9 | 253 | | 0 | 0 | 0 | 0 | 0 | 0 | 0 | 0 | 0 | 10 | 0 | 0 | 0 | 0 | 0 | 0 | 0 | 0 |
| 10 | 255 | | 0 | 0 | 0 | 0 | 0 | 0 | 0 | 0 | 0 | 8 | 5 | 6 | 6 | 6 | 6 | 0 | 0 | 0 |
| 11 | 26 | SWITCH | 0 | 0 | 0 | 0 | 0 | 0 | 0 | 0 | 0 | 1 | 0 | 0 | 0 | 0 | 0 | 0 | 0 | 0 |
| 12 | 240 | | 0 | 0 | 0 | 0 | 0 | 0 | 0 | 0 | 0 | 0 | 0 | 1 | 1 | 1 | 1 | 1 | 1 | 6 |
| 13 | 240 | | 0 | 0 | 0 | 0 | 0 | 0 | 0 | 0 | 0 | 0 | 0 | 0 | 0 | 0 | 0 | 0 | 0 | 0 |
| 14 | 240 | | 0 | 0 | 0 | 0 | 0 | 0 | 0 | 0 | 0 | 0 | 0 | 0 | 0 | 0 | 0 | 0 | 0 | 0 |
| 15 | 1 | OR | 0 | 0 | 0 | 0 | 0 | 0 | 0 | 0 | 0 | 1 | 1 | 1 | 1 | 1 | 1 | 2 | 2 | 2 |
| 16 | 240 | | 0 | 0 | 0 | 0 | 0 | 0 | 0 | 0 | 0 | 0 | 0 | 2 | 2 | 2 | 2 | 2 | 2 | 6 |
| 17 | 240 | | 0 | 0 | 0 | 0 | 0 | 0 | 0 | 0 | 0 | 0 | 0 | 0 | 0 | 0 | 0 | 0 | 0 | 0 |
| 18 | 8 | PID | 0 | 0 | 0 | 3 | 2500 | 0 | 0 | 0 | 0 | 1 | 1 | 1 | 2 | 2 | 2 | 2 | 2 | 5 |
| 19 | 240 | | 0 | 0 | 0 | 0 | 0 | 0 | 0 | 0 | 0 | 0 | 0 | 0 | 0 | 0 | 0 | 0 | 0 | 0 |
| 20 | 240 | | 0 | 0 | 0 | 0 | 0 | 0 | 0 | 0 | 0 | 0 | 0 | 0 | 0 | 0 | 0 | 0 | 0 | 0 |
| 21 | 241 | | 0 | 0 | 0 | 0 | 0 | 0 | 0 | 0 | 0 | 0 | 0 | 0 | 0 | 0 | 0 | 0 | 0 | 0 |
| 22 | 241 | | 0 | 0 | 0 | 0 | 0 | 0 | 0 | 0 | 0 | 0 | 0 | 0 | 0 | 0 | 0 | 0 | 0 | 0 |
| 23 | 1 | OR | 0 | 0 | 0 | 0 | 0 | 0 | 0 | 0 | 0 | 1 | 1 | 1 | 1 | 1 | 1 | 2 | 2 | 2 |
| 24 | 8 | PID | 0 | 0 | 0 | 3 | 2500 | 0 | 0 | 0 | 0 | 1 | 1 | 1 | 2 | 2 | 2 | 2 | 2 | 5 |
| 25 | 252 | | 0 | 0 | 0 | 0 | 0 | 0 | 0 | 0 | 0 | 0 | 0 | 0 | 0 | 0 | 0 | 0 | 0 | 0 |
| 26 | 254 | | 0 | 0 | 0 | 0 | 0 | 0 | 0 | 0 | 0 | 0 | 0 | 0 | 0 | 0 | 0 | 0 | 0 | 0 |
| 27 | 241 | | 0 | 0 | 0 | 0 | 0 | 0 | 0 | 0 | 0 | 0 | 0 | 0 | 0 | 0 | 0 | 0 | 0 | 0 |
| 28 | 251 | | 0 | 0 | 0 | 0 | 0 | 0 | 0 | 0 | 0 | 0 | 9 | 9 | 9 | 9 | 9 | 9 | 5 | 0 |
| 29 | 253 | | 0 | 0 | 0 | 0 | 0 | 0 | 0 | 0 | 0 | 10 | 0 | 0 | 0 | 0 | 0 | 0 | 0 | 0 |
| 30 | 240 | | 0 | 0 | 0 | 0 | 0 | 0 | 0 | 0 | 0 | 10 | 0 | 0 | 0 | 0 | 0 | 0 | 0 | 0 |
| 31 | 36 | LIMIT | 0 | 100 | 0 | 0 | 0 | 0 | 0 | 0 | 0 | 1 | 2 | 2 | 2 | 2 | 5 | 0 | 0 | 0 |
| 32 | 253 | | 0 | 0 | 0 | 0 | 0 | 0 | 0 | 0 | 0 | 10 | 0 | 0 | 0 | 0 | 0 | 0 | 0 | 0 |
| 33 | 240 | | 0 | 0 | 0 | 0 | 0 | 0 | 0 | 0 | 0 | 5 | 5 | 5 | 5 | 5 | 5 | 9 | 5 | 0 |
| 34 | 251 | | 0 | 0 | 0 | 0 | 0 | 0 | 0 | 0 | 0 | 0 | 0 | 0 | 0 | 0 | 0 | 0 | 0 | 0 |
| 35 | 7 | VELP | 0 | 0 | 0 | 0 | 0.54 | 0 | 0 | 0 | 0 | 10 | 0 | 0 | 0 | 0 | 0 | 0 | 0 | 0 |
| 36 | 253 | | 0 | 0 | 0 | 0 | 0 | 0 | 0 | 0 | 0 | 10 | 0 | 0 | 0 | 0 | 0 | 0 | 0 | 0 |
| 37 | 240 | | 0 | 0 | 0 | 0 | 0 | 0 | 0 | 0 | 0 | 0 | 0 | 1 | 1 | 1 | 1 | 5 | 0 | 0 |
| 38 | 35 | RATIO | 0 | 0 | 0 | 0 | 0 | 0 | 0 | 0 | 0 | 9 | 9 | 9 | 9 | 9 | 9 | 5 | 0 | 0 |
| 39 | 240 | | 0 | 0 | 0 | 0 | 0 | 0 | 0 | 0 | 0 | 0 | 0 | 0 | 0 | 0 | 0 | 0 | 0 | 0 |
| 40 | 251 | | 0 | 0 | 0 | 0 | 0 | 0 | 0 | 0 | 0 | 0 | 0 | 0 | 0 | 0 | 0 | 0 | 0 | 0 |
| 41 | 39 | OVERIDE | 0 | 0 | 0 | 0 | 0 | 0 | 0 | 0 | 0 | 0 | 0 | 1 | 1 | 1 | 1 | 1 | 2 | 2 |
| 42 | 39 | OVERIDE | 0 | 0 | 0 | 0 | 0 | 0 | 0 | 0 | 0 | 0 | 0 | 1 | 1 | 1 | 1 | 1 | 2 | 5 |

```
                                              ControlLoops.txt
Control Loop Configuration
Cfg File Data
12 00 8200 8201 0000 0000 8203 8106 0000 0000 0000 00 00
29 00 8200 8202 8000 0000 0000 0000 8106 8002 8003 00 00
13 00 0000 0000 0000 8001 8002 8003 0000 8004 8107 01 01
1A 00 8107 8006 8204 8205 0000 0000 0000 0000 0000 00 00
01 00 8204 8205 0000 0000 0000 0000 8300 8300 8207 00 01
08 00 8001 8004 8206 8301 8302 8300 8300 8300 8010 00 00
01 00 8006 0000 0000 0000 0000 0000 8300 8300 8206 00 01
08 00 8001 8004 8207 8301 8302 8300 8300 8300 8007 01 00
25 00 8014 8303 8300 8005 0000 0000 0000 0000 0000 00 00
07 00 9002 8109 0000 0000 810A 8009 8108 8008 0000 00 00
24 00 8009 810E 800A 8013 800B 800C 0000 0000 0000 01 00
27 00 0000 0000 0000 810B 0000 0000 8013 8300 800B 00 00
27 00 0000 0000 0000 810C 0000 0000 810E 8300 800A 00 00
0E 00 8010 800C 800F 8013 8208 800D 810A 800E 8014 00 00
1B 00 8107 8011 8011 810F 0000 0000 0000 0000 8012 00 00
1B 00 8107 810D 810D 810F 0000 0000 0000 0000 8013 00 00
19 00 0000 8209 0000 0000 8012 810E 0000 0000 800F 01 00
1A 00 8208 0000 0000 0000 0000 0000 0000 8209 0000 00 00
18 00 8203 810E 810E 8300 810E 8110 0000 0000 8011 00 00
7F 00 0000 0000 0000 0000 0000 0000 0000 0000 0000 00 00
7F 00 0000 0000 0000 0000 0000 0000 0000 0000 0000 00 00
7F 00 0000 0000 0000 0000 0000 0000 0000 0000 0000 00 00
7F 00 0000 0000 0000 0000 0000 0000 0000 0000 0000 00 00
7F 00 0000 0000 0000 0000 0000 0000 0000 0000 0000 00 00
7F 00 0000 0000 0000 0000 0000 0000 0000 0000 0000 00 00
7F 00 0000 0000 0000 0000 0000 0000 0000 0000 0000 00 00
7F 00 0000 0000 0000 0000 0000 0000 0000 0000 0000 00 00
7F 00 0000 0000 0000 0000 0000 0000 0000 0000 0000 00 00
7F 00 0000 0000 0000 0000 0000 0000 0000 0000 0000 00 00
7F 00 0000 0000 0000 0000 0000 0000 0000 0000 0000 00 00
7F 00 0000 0000 0000 0000 0000 0000 0000 0000 0000 00 00
7F 00 0000 0000 0000 0000 0000 0000 0000 0000 0000 00 00
7F 00 0000 0000 0000 0000 0000 0000 0000 0000 0000 00 00
7F 00 0000 0000 0000 0000 0000 0000 0000 0000 0000 00 00
7F 00 0000 0000 0000 0000 0000 0000 0000 0000 0000 00 00
7F 00 0000 0000 0000 0000 0000 0000 0000 0000 0000 00 00
7F 00 0000 0000 0000 0000 0000 0000 0000 0000 0000 00 00
7F 00 0000 0000 0000 0000 0000 0000 0000 0000 0000 00 00
7F 00 0000 0000 0000 0000 0000 0000 0000 0000 0000 00 00
7F 00 0000 0000 0000 0000 0000 0000 0000 0000 0000 00 00
7F 00 0000 0000 0000 0000 0000 0000 0000 0000 0000 00 00
7F 00 0000 0000 0000 0000 0000 0000 0000 0000 0000 00 00
7F 00 0000 0000 0000 0000 0000 0000 0000 0000 0000 00 00
7F 00 0000 0000 0000 0000 0000 0000 0000 0000 0000 00 00
7F 00 0000 0000 0000 0000 0000 0000 0000 0000 0000 00 00
7F 00 0000 0000 0000 0000 0000 0000 0000 0000 0000 00 00
```

*Figure 24*

```
                                    ProjectSummary.txt
Device Name  VAVModReheat3

Resource Useage
# Control Floats = 21
# Control Digitals = 10
# Control NonVolatiles = 17
# Flash Constants = 5
Bytes RAM pool Used = 192
Bytes Loop Static = 34
# Function Blocks = 19
# User NVIs = 10
# User NVOs = 3

Function Block Data

Type            Name
OCC_ARB         OCC_ARB3
wrd  Name                   PVID(hex)  PVID(dec)  Value
0    schedCurrentState      8200       33280      0
1    wmOverride             8201       33281      0
2    networkManOcc          0000       00000      0
3    occSensorState         0000       00000      0
4    effOccCurrentState     8203       33283      0
5    manOverrideState       8106       33030      0
6    unused1                0000       00000      0
7    unused2                0000       00000      0
8    unused3                0000       00000      0
Byt  Name                   Value
0    netLastInWins          0
1    occSensorOper          0
2    spare                  0
Type            Name
TEMP_SPCALC     TEMP_SPCALC4
wrd  Name                   PVID(hex)  PVID(dec)  Value
0    effOccCurrentState     8200       33280      0
1    schedNextState         8202       33282      0
2    schedTuncos            8000       32768      0
3    setpoint               0000       00000      0
4    heatRampRate           0000       00000      0
5    coolRampRate           0000       00000      0
6    manOverrideState       8106       33030      0
7    effHeatSP              8002       32770      0
8    effCoolSP              8003       32771      0
Byt  Name                   Value
0                           0
1                           0
2    spare                  0
Type            Name
TEMP_MODE       TEMP_MODE5
wrd  Name                   PVID(hex)  PVID(dec)  Value
0    sysSwitch              0000       00000      0
1    cmdMode                0000       00000      0
2    supplyTemp             0000       00000      0
3    spaceTemp              8001       32769      0
4    effHeatSP              8002       32770      0
5    effCoolSP              8003       32771      0
6    allowAutoChange        0000       00000      0
7    effSetpt               8004       32772      0
8    effTempMode            8107       33031      0
Byt  Name                   Value
0    controlType            1
1                           1
2    spare                  0
```

*Figure 25*

```
#Piranha Config File for 90000c6822030438 VAVModReheat3
010192AD030000
01909EFF00006E6369554943616C4F6666736574000D9FFF00006E766954696D
6553657400000000000A0FF22006E76694D616B56616C00000000000000009EFF
00006E766F494F31000000000000000000A1FF00006E766F494F3200000000
00000000000A2FF00006E766F494F3300000000000000000009FFF0C006E76
6F54696D6500000000000000000A3FF00006E636953657470F696E6F7430000
0000A4FF20004E564946660C6F774F6657272696466000DFF00004B2046616374
6F72000000000000000012FF00006D65617375726564D696E464C6F770012FF
00006D65617375726564D6178466C6F770013FF000044757374417265610000
000000000000012FF00004F63634D696E466C7753657450740012FF00005374
616E644279444D696E466C77536612FF00004D6178466C77536574470740000
000012FF00005265686561744C6F7753657450740000AFF04006E766F426F78
466C6F7700000000000A5FF04006E766F44617461000000000000000000A6FF
04006E766F44617465313200000000000000
03020FE1090360
02D920000000000092010D0000000092020D0000000092030D000000000003204
0D0000000092050D0000000092060D0000000000000E0000000000010F000000
00C0020F000000000C0030F00000000C0040F0000000C0050F000000094000B
000000094010B0000000094020B000000009A00B00000000009000000000
90010D00000000090020D000000000090030D00000000090040D000000090050D00
000000090060D000000000090070D00000000093000D00000000093010D00000000093
020D00000000093030D000000000094000B000000000094010B000000000094020B0000
000095000B000000095010B000000095020B000000095030B00000000009504
0B000000009505B000000000095060B000000000095070B00000000C000B0000000
00C0010F00000000C0020F000000000C0030F0000000C0040F00000000C0050F
00000000810008000000008101080000000081020800000000081030800000000
81040800000000081050800000000082080F000000000000B00000000800D0D00
000000081090D000000000810C120000000081081200000000810A130000000081
0E120000000081101200000000810D1200000000810F120000000800C0A0000
0000800040800000000082030D000000080010800000000081070D000000000008010
0B00000000800E1200000000800F120000000080050B000000008006070B000000
0080080308000000080020800000000
0301BA6D8506AC
01B81200820082010000000082038106000000000000003900820082028000
00000000000081068002800300013000000000000080018002800300008004
810701011A00810780068204820500000000000000000001008204820500
0000000000000000083008300820700010800800180048206830183028300830
830086100000100800600000000000000000000830083008206000108008001
80048207830183028300830083008007010025008014830383008005000000080
000000000000000070090028109000000000810A80098108880080000000002400
8009810B800A80138008800000000000001002700000000000000000810B00000
0000801383008008000000000000000000081083000800800000000
0E00080100800C800F801382080800D0810A800E8014000018008107801180118108F
000000000000000081200001B008107810D810D810F000000000000008013
0000190000008209000000008013810E000000000800F0001A0082080000000
0000000000000000082090000000001800820381083810E830083010E811000000000
8011600007F00000000000000000000000000000000000000
040016CB580F48
0014000000040400000451C400043C0000000000000
0501B72B00FBC
01B501B5276000A0006805D8849804A885A885C80089008800A000A000890088
008000A000A0008900896B896B100B054800A000A0A0008054800008000080
008000800080008008008008008008008263328344030485F64654F
626A65374B23030373006972616B661010403023313903901040307C32
0010403C35001040307C36001040307C370010403070310010403023313031
```

```
#Piranha Parameter File for 90000c6822030438 VAVModReheat3
100046754F0000
0044000000000000000000000000000000000000000000000000447A
00003F0A3D71447A00003F0A3D717F8000007F80000044480000043480000043C8
000043480000
110022F14C00B8
0020000000000000000000000000000000000000000000000000000000
0000
18000ACBCA00DC
0008FF0000000100FFFF
190005D8BC00E8
0003010101
130006BB5D0112
000404020A25
1500622D07011A
00600001E0010528FF0000FF00000001E0010528FF0000FF00000001E0010528
FF0000FF00000001E0010528FF0000FF00000001E0010528FF0000FF00000001
E0010528FF0000FF00000001E0010528FF0000FF0000FF0000FF0000FF0000FF
0000
1600202A45017E
001E000000000000000000000000000000000000000000000000000000
1B000684C001A0
000400000000
1C0014471401A8
00125641564D6F645265686561743300000000
1D000CE13901BE
000A000000000000000000
```
*Figure 27* — 505

```
                              VAVModReheat3NM.txt
#comment, for twisted pair FTT version of Piranha,,,,,,,,,,,,,,
#data,Node,90000c6822030438,VAVModReheat3,PIR1,,,,,,,,,,
#data,Nv,90000c6822030438,nroPgmVer,0,CONST,0,0,0
#data,NV,90000c6822030438,nvoNodeStatus,1,OUT,0,0,0                                    506
#data,NV,90000c6822030438,nviFileRequest,2,IN,0,0,0
#data,NV,90000c6822030438,nvoFileStatus,3,OUT,0,0,0
#data,NV,90000c6822030438,nviFilePos,4,IN,0,0,0
#data,NV,90000c6822030438,nviNodeRequest,5,IN,0,0,0
#data,NV,90000c6822030438,nvoConfigError,6,OUT,0,0,0
#data,NV,90000c6822030438,nciApplVerNew,7,CONFIG,0,0,0
#data,NV,90000c6822030438,nviDebugIndex,8,IN,0,0,0
#data,NV,90000c6822030438,nvoDebug1,9,OUT,0,0,0
#data,NV,90000c6822030438,nvoDebug2,10,OUT,0,0,0
#data,NV,90000c6822030438,nciDeviceName,11,CONFIG,0,0,0
#data,NV,90000c6822030438,nviInUse,12,IN,0,0,0
#data,NV,90000c6822030438,nvoAlarmH,13,OUT,0,0,0
#data,NV,90000c6822030438,nvoAlarmStatus,14,OUT,0,0,0
#data,NV,90000c6822030438,nvoError,15,OUT,0,0,0
#data,NV,90000c6822030438,nciAlarmInhibit,16,CONFIG,0,0,0
#data,NV,90000c6822030438,nciSndHrtBt,17,CONFIG,0,0,0
#data,NV,90000c6822030438,nciRcvHrtBt,18,CONFIG,0,0,0
#data,NV,90000c6822030438,nciUICalOffset,19,CONFIG,0,0,0
#data,NV,90000c6822030438,nviTimeSet,20,IN,0,0,0
#data,NV,90000c6822030438,nviManVal,21,IN,0,0,0
#data,NV,90000c6822030438,nvoIO1,22,OUT,0,0,0
#data,NV,90000c6822030438,nvoIO2,23,OUT,0,0,0
#data,NV,90000c6822030438,nvoIO3,24,OUT,0,0,0
#data,NV,90000c6822030438,nvoTime,25,OUT,0,0,0
#data,NV,90000c6822030438,nciSetpoints,26,CONFIG,0,0,0
#data,NV,90000c6822030438,NVIFlowOverride,27,IN,0,0,0
#data,NV,90000c6822030438,K_Factor,28,CONFIG,0,0,0
#data,NV,90000c6822030438,measuredMinFlow,29,CONFIG,0,0,0
#data,NV,90000c6822030438,measuredMaxFlow,30,CONFIG,0,0,0
#data,NV,90000c6822030438,DuctArea,31,CONFIG,0,0,0
#data,NV,90000c6822030438,OccMinFlowSetPt,32,CONFIG,0,0,0
#data,NV,90000c6822030438,StandByMinFlowSetPt,33,CONFIG,0,0,0
#data,NV,90000c6822030438,MaxFlowSetpt,34,CONFIG,0,0,0
#data,NV,90000c6822030438,ReheatFlowSetPt,35,CONFIG,0,0,0
#data,NV,90000c6822030438,nvoBoxFlow,36,OUT,0,0,0
#data,NV,90000c6822030438,nvoData,37,OUT,0,0,0
#data,NV,90000c6822030438,nvoData2,38,OUT,0,0,0
#data,Field,90000c6822030438,nroPgmVer,hwId,UN,0,0,2,0,1,0,0,0,
#data,Field,90000c6822030438,nroPgmVer,applId,UN,2,0,2,0,1,0,0,0,
#data,Field,90000c6822030438,nroPgmVer,majorver,UN,4,0,1,0,1,0,0,0,
#data,Field,90000c6822030438,nroPgmVer,minorver,UN,5,0,1,0,1,0,0,0,
#data,Field,90000c6822030438,nroPgmVer,bootVer,UN,6,0,1,0,1,0,0,0,
#data,Field,90000c6822030438,nroPgmVer,nodeType,UN,7,0,1,0,1,0,0,0,
#data,Field,90000c6822030438,nvoNodeStatus,stObjectID,UN,0,0,2,0,1,0,0,0,
#data,Field,90000c6822030438,nvoNodeStatus,stInvalidID,&BOOLEAN,2,7,1,0,1,0,0,0,
data,Field,90000c6822030438,nvoNodeStatus,stInvalidRequest,&BOOLEAN,2,6,1,0,1,0,0,0 data,Field,90000c6822030438,nvoNodeStatus,stDisabled,&BOOLEAN,2,5,1,0,1,0,0,0,
data,Field,90000c6822030438,nvoNodeStatus,stOutOfLimits,&BOOLEAN,2,4,1,0,1,0,0,0,
#data,Field,90000c6822030438,nvoNodeStatus,stOpenCircuit,&BOOLEAN,2,3,1,0,1,0,0,0,
#data,Field,90000c6822030438,nvoNodeStatus,stOutOfService,&BOOLEAN,2,2,1,0,1,0,0,0,
#data,Field,90000c6822030438,nvoNodeStatus,stMechanicalFault,&BOOLEAN,2,1,1,0,1,0,0,
0,
#data,Field,90000c6822030438,nvoNodeStatus,stFeedbackFailure,&BOOLEAN,2,0,1,0,1,0,0,
0,
#data,Field,90000c6822030438,nvoNodeStatus,stOverRange,&BOOLEAN,3,7,1,0,1,0,0,0,
#data,Field,90000c6822030438,nvoNodeStatus,stUnderRange,&BOOLEAN,3,6,1,0,1,0,0,0,
#data,Field,90000c6822030438,nvoNodeStatus,stElectricalFault,&BOOLEAN,3,5,1,0,1,0,0,
0,
```

GRAPHICAL LANGUAGE COMPILER SYSTEM

This application is a continuation-in-part of U.S. patent application Ser. No. 11/427,750, filed Jun. 29, 2006.

This application is a continuation-in-part of U.S. patent application Ser. No. 11/670,911, filed Feb. 2, 2007.

This application is a continuation-in-part of U.S. patent application Ser. No. 11/620,431, filed Jan. 5, 2007.

This application is a continuation-in-part of U.S. patent application Ser. No. 11/564,797, filed Nov. 29, 2006.

U.S. patent application Ser. No. 11/670,911, filed Feb. 2, 2007, is hereby incorporated by reference. U.S. patent application Ser. No. 11/620,431, filed Jan. 5, 2007, is hereby incorporated by reference. U.S. patent application Ser. No. 11/427,750, filed Jun. 29, 2006, is hereby incorporated by reference. U.S. patent application Ser. No. 11/564,797, filed Nov. 29, 2006, is hereby incorporated by reference. U.S. patent application Ser. No. 11/559,706, filed Nov. 14, 2006, is hereby incorporated by reference. U.S. patent application Ser. No. 10/809,115, filed Mar. 25, 2004, is hereby incorporated by reference.

BACKGROUND

The present invention pertains to controlling energy conversion devices and particularly to patterns of controlling the devices. More particularly, the invention pertains to for designing systems for controlling these devices.

SUMMARY

The invention is a control system language compiler system.

BRIEF DESCRIPTION OF THE DRAWING

FIG. 7 shows a table of data from the simulation of the designed circuit or system of FIGS. 5 and 6;

FIG. 23 shows an illustrative example of a spreadsheet for data in a comma separated value format;

FIG. 24 reveals an example of an intermediate file for a function block system;

FIG. 25 is an example of a summary file of the spreadsheet in FIG. 23;

FIG. 26 is an example of a configuration (CFG) file;

FIG. 27 is an example of a Piranha™ parameter file;

FIG. 28 is an example of a text file of Piranha™ related information; and

DESCRIPTION

Figure 1:
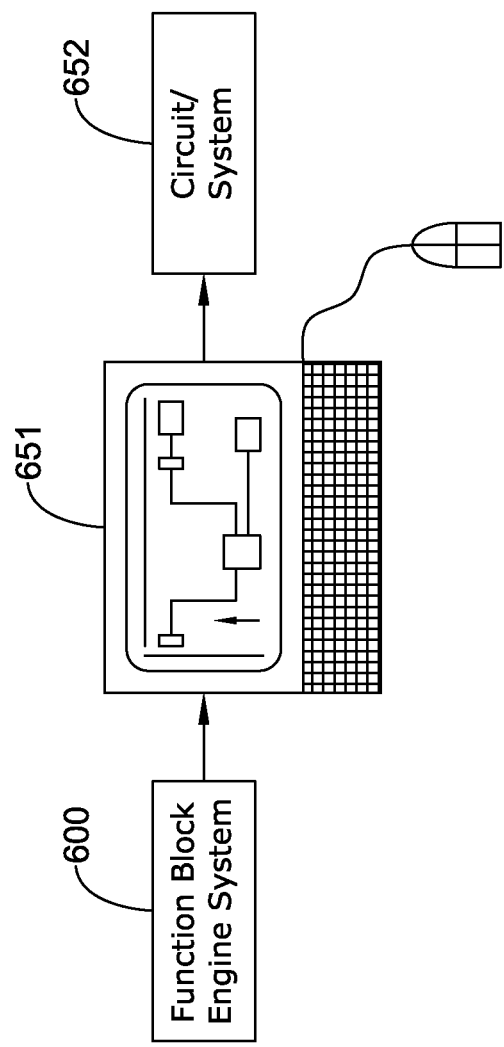
FIG. 1 is a diagram of a relationship of the function block engine system, computer and resulting circuit or system.

Commercial controls, for instance HVAC control systems, are becoming increasing complex with additional power and features required to meet customer needs. At the same time, there is advancement of the power of low cost microprocessors that will allow the most common control components to be created with large power at low cost. There exists a need to have the complex controls be easily used in a low cost environment, pushing the complexity of configuration and design into a high powered configuration tool and keep the low cost powerful microprocessor resources dedicated to the computer.

One may design and/or implement a system controller or another system having virtually no hardware except for the computer used to design and put the resulting software into a memory, e.g., in a form of microcode or other manner. An ordinary computer, though not necessary, may provide the resulting function block engine designed software input to it, i.e., to a memory, and the computer may effectively become the designed controller with function blocks, interconnections, links, inputs, outputs, selections, adjustments, interfaces, a display, visual and/or audio indicators for showing variables, parameters, readings, prescriptions, results, on-station and/or remote monitoring and control whether by keyboard, mouse, touch screen, voice command, eye tracking and blinking control, or other communicative manner, having diagnostics, simulation capabilities within itself and a system to be controlled, plus more, effectively all in conveyable software. The function block system could be designed and implemented without a computer. However, for an illustrative instance, one's personal computer or other mechanism may be loaded with and use the present system level function block engine to design virtually any kind of system controller in a context of software. After design, simulation and testing, as desired, this computer may become the designed system controller for an actual application, or the software may be transferred to another computer or other device to become the system controller. The computer, or some other like-designed processor, programmable personal assistant (PDA), cell phone, device and so on, with the software may become the designed system controller such as, for one among many examples, a programmable thermostat for a building HVAC. Communication between the controller on the computer and the controlled system may be via wireless or non-wireless media.

Additionally, in the commercial HVAC industry, there may be a need to have complex applications that are tested and implemented in controlling devices. These devices should be low cost and be able to meet application needs. There is a need to have a flexible low cost controller that allows applications to be met as demands change within the low cost controller platform and tools. The function block framework of the present invention may provide a logical application structure that allows a system control application designer (e.g., HVAC) to combine pre-designed blocks featuring powerful control capabilities and thorough connections of libraries and block functions, that may be incorporated the development of sophisticated applications to meet new and advanced customer needs.

The present function block engine system may use relatively little memory in view of its significantly powerful and revolutionary capabilities. Programmable controllers may be implemented as engines that can interpret a meta language that is resident wholly or partially in a random access memory (RAM) as it runs. This means that minimal RAM requirements for a small program may be about 15K bytes (Kb) and can grow in proportion to the program. An inexpensive microprocessor may typically have a rather small RAM (e.g., 2K bytes or less) which means that a little amount of RAM (i.e., about 1Kb) is available after operating system (OS) and communication capabilities are taken into consideration. However, by providing programmability from a function block engine, as described herein, that is resident in FLASH and having the functions use a common pool of RAM to hold minimal static value storage while the rest of the pool is reused by all the blocks for temporary execution space, fairly complex programs can be executed with a fixed memory allocation of about 1K of RAM. The program may simply be a list of "function" calls, as described by the function block definitions herein, which can be downloaded to a small file in FLASH.

FIG. 1 is a diagram showing relationship of the function block engine system 600, computer 651 and a resulting circuit or system 652. One may take the present function block engine system 600, perhaps on a memory medium (e.g., disk, FLASH, stick, or the like) to store and/or load it into a memory of an operating system such as that of a personal computer 651. One may design a circuit or system 652, for example, a controller, with the function block engine system 600. That circuit or system 652 may be put into a memory, for instance, in microcode, or another code, manner or mode. The memory with the system 652 may be tied in with an operating system to provide the activity of a controller having the connections with the hardware or other to be controlled and monitored based on the function block designed system 652.

FIGS. 2-8 show an operation for designing simple example system 652 with the function block engine system 600. This operation may be implemented in a system designer and simulator on a personal computer 651 with software such as, for example, "Microsoft Windows XP Professional™". One may have a screen like that shown in FIG. 2. A mouse may be used to move an arrow 611 to click on "controller" and then on "configure" of the tool bar 612. Then one may, for example, click and drag out a function block 601 entitled "Timeset" from function block source area 602 into an area 603 of a display screen with the mouse arrow 611. Even though a function block 601, for instance, may be dragged from area 203 to area 603, the source 601 of the function block would remain in area 602. Then one may drag a Limit 604 from area 602 to area 603. One may place the mouse arrow 611 on an output terminal 605 of block 601 and drag a connection 606 to an input terminal 607 of limit 604. An add function block 608 may be dragged from area 602 to area 603. A network variable input block 609 may be dragged with the mouse arrow 611 into area 603. A multiply function block 610 may be dragged from area 602 to area 603. The mouse arrow 611 may be placed and clicked on a terminal 613 of block 609 and a line 614 may be dragged from terminal 613 to a terminal 615 of function block 610 to make a connection between block 610 and input 609. In a similar manner a line 616 may be dragged from an output terminal 617 of block 610 to an input terminal 618 of block 608. Also, a connection may be made with a line 619 from an output terminal 621 of limit block 604 to an input terminal 622 of the add block 608. The add function block 608 may add input values at terminals 618 and 622 to result in a sum at an output terminal 623 of block 608. The output at terminal 623 may be provided to an input terminal 624 of another limit function block 625 with a line 626. The source of limit function block 625 may be the same as that for limit function block 604 which is from area 602. To check the inputs of add function block 608, one may right click the mouse and click on edit to get a dialogue box that shows the inputs which may changed to one or more parameters with values placed in them in lieu of inputs to the add function block 608. The same may be done for the multiply function block 610 where one input is replaced with a parameter of four which can be multiplied with a value at input at 615 to get a result at terminal 617. Also, other things, such as function block names, may be changed in this right-clicked edit dialogue box.

The circuit or system design with function blocks in area 603 may continue on to another page as shown in the tool bar 612. The pages may be relabeled, for example, as page 1 was relabeled ad ADD1 at place 626 and page 2 was relabeled as ADD2 at place 627. The circuit or system may be continued on to the next page ADD2 with a TAG connection block 628, which can be dragged with the arrow 611 from the block source area 602 to area 603. An output terminal 629 of block 625 may be connected with a line 631 dragged out with arrow 611 from terminal 629 to a terminal 632 of tag block 628.

Figure 3:
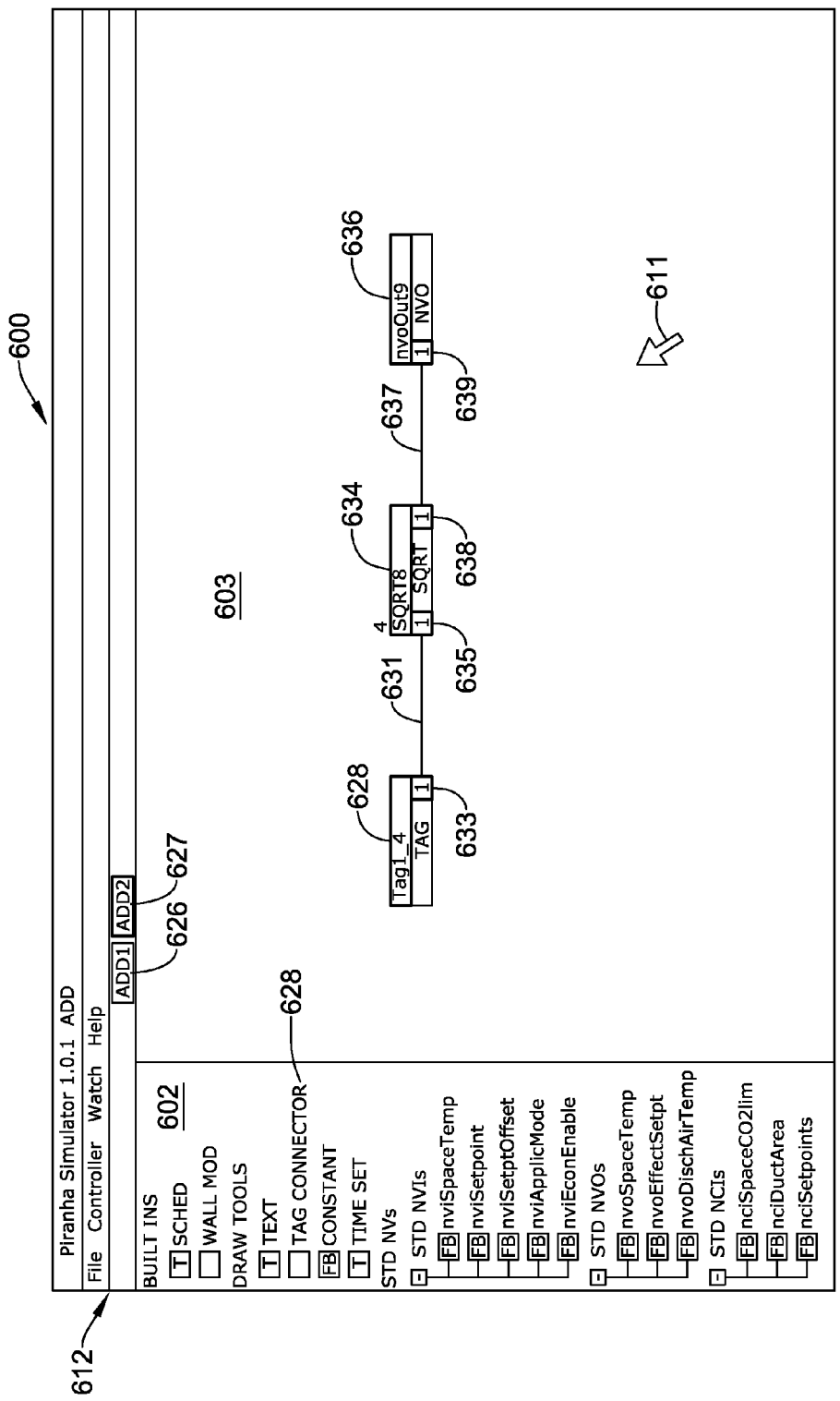
FIG. 3 shows a second page of the screen of FIG. 2.

FIG. 3 shows a continuation of the circuit or system from page ADD1 to page ADD2. Tag 628 may be a continuation of line 631 via input terminal 632 and an output terminal 633 of tag 628 in FIG. 3. A square root function block 634 may be dragged from area 602 to area 603 of the display. The line 631 connection may be dragged with the arrow 611 from terminal 633 to an input terminal 635 of the square root function block 634. A network variable output 636 may be dragged from area 602 into area 603 of the display with the mouse arrow 611. A connection line 637 may be dragged from an output terminal 638 of block 634 to a terminal 639 of output block 636.

The ADD1 626 and ADD 627 pages may themselves be placed into individual function blocks with their respective inputs and outputs. The block of pages 626 and 627 may be placed into one function block. If there are other function blocks having a number of pages of circuits made from various function blocks, they also may be combined into one function block. These one function blocks might be interconnected and also combined into still another one function block. This hierarchical progression of function blocks being combined may continue until an entire system of a design is in one block, such as an aircraft instrumentation, industrial plant, HVAC or some other kind of controller. The resulting function block might be treated as a black box in some instances.

Figure 4:
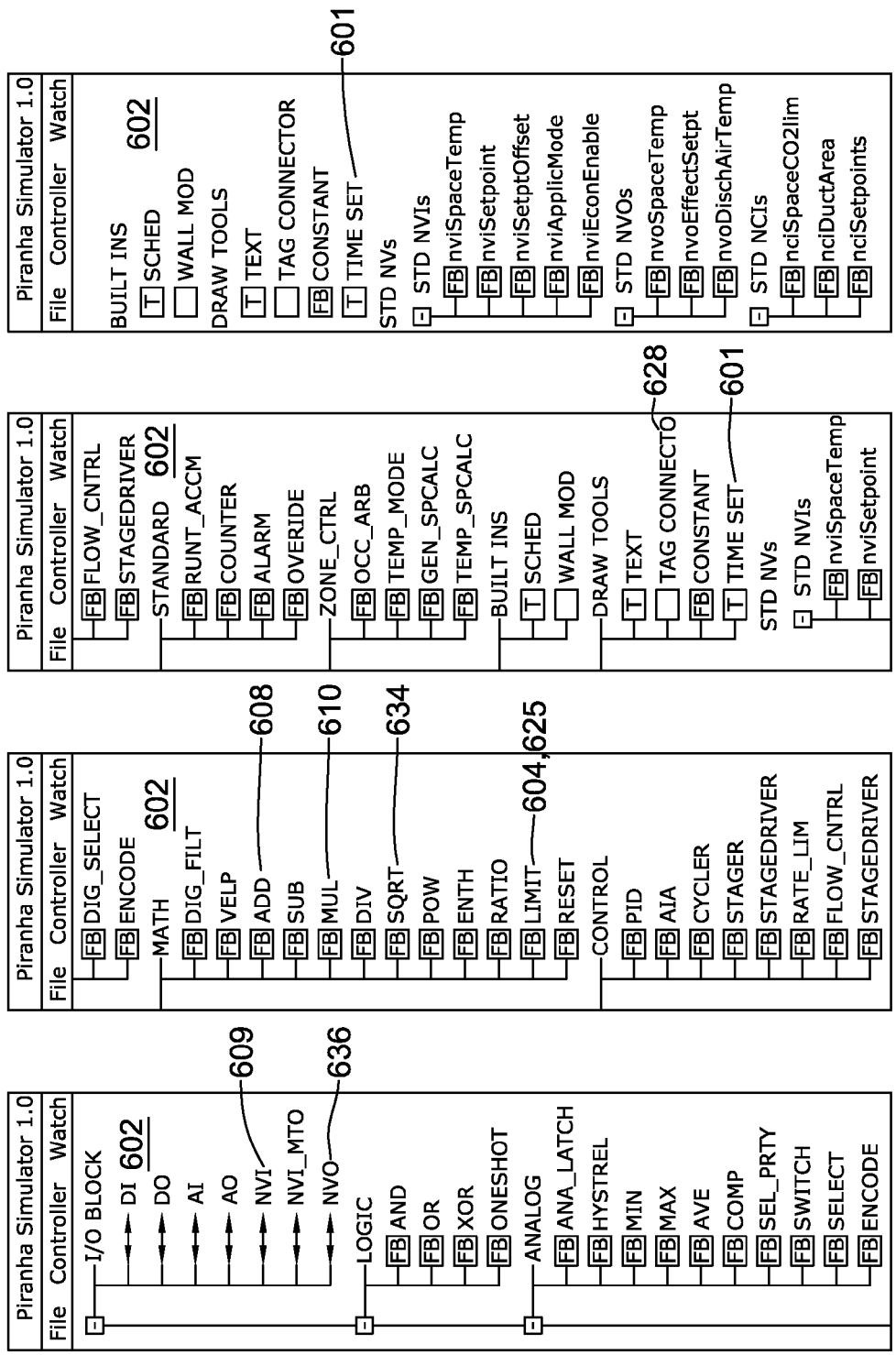
FIG. 4 shows from the screen a partial list of function blocks and other items that may be used in designing a circuit or system.

FIG. 4 shows a list of function blocks and terminals in area 602 of the display that may be selected for developing various kinds of designs. The list is not inclusive in that other function blocks and terminals may be added.

Figure 2:
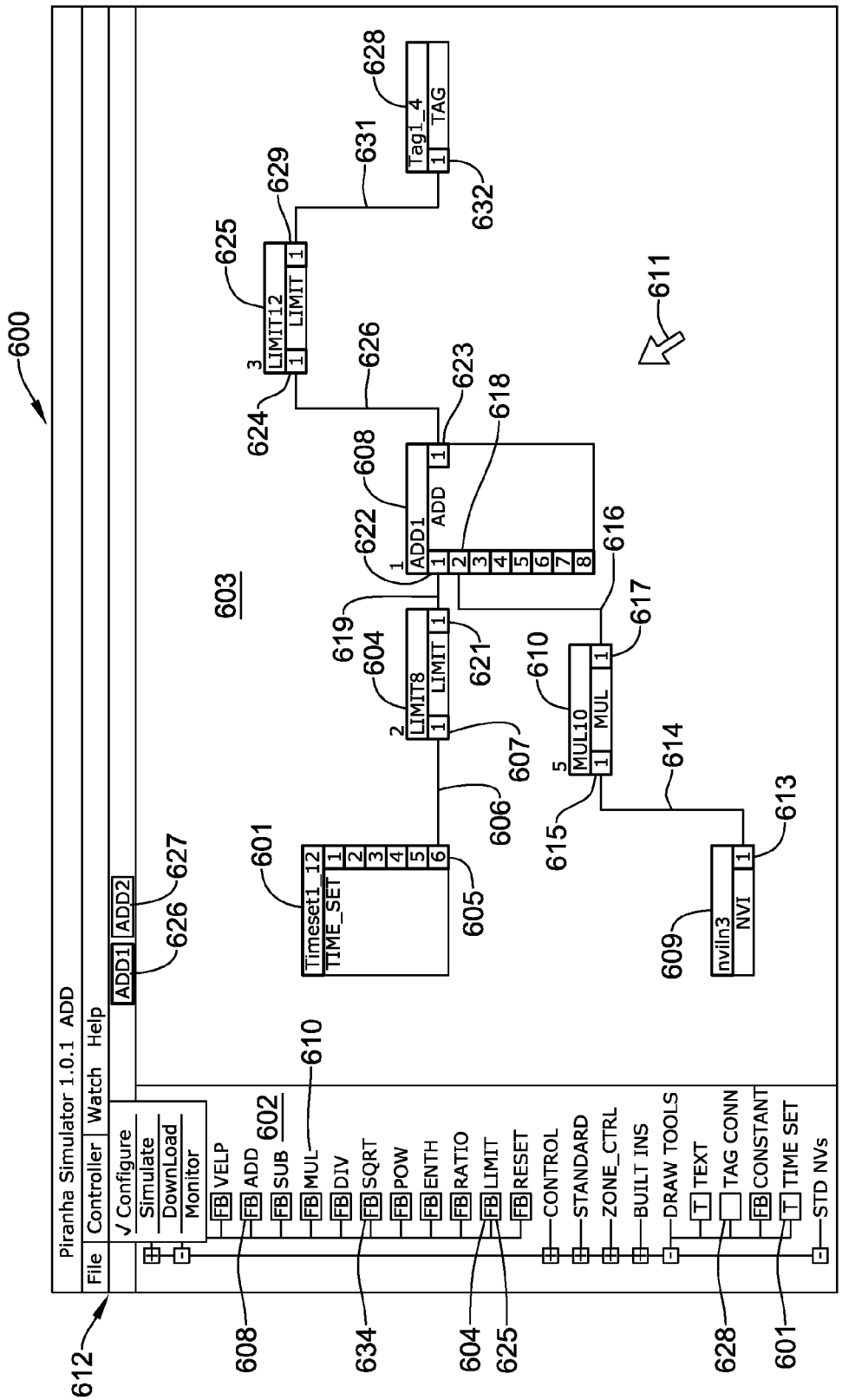
FIG. 2 shows a display screen set up for designing circuits or systems with function blocks.
Figure 5:
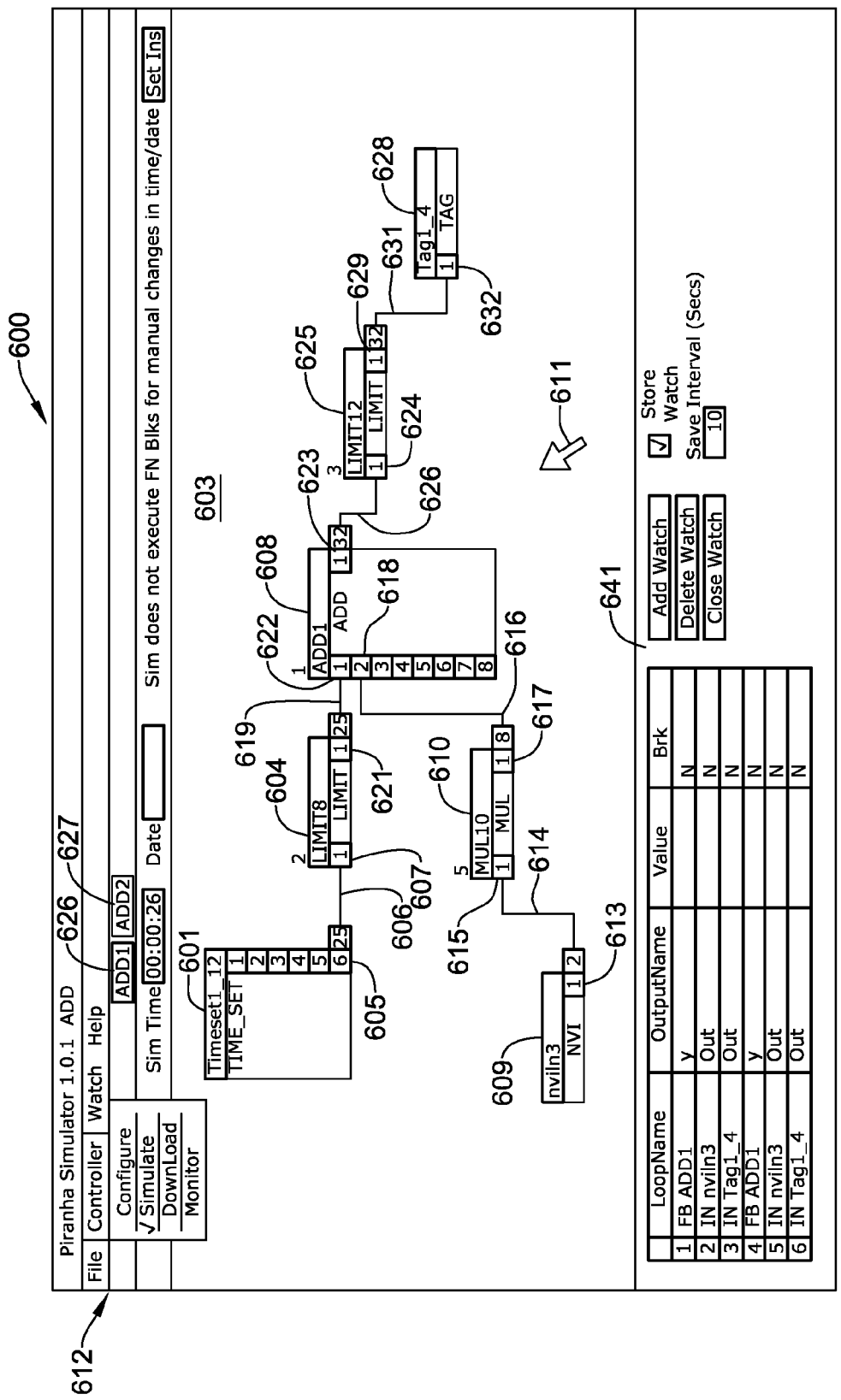
FIG. 5 shows a screen for a simulate mode for the designed circuit or system of FIGS. 3 and 4.
Figure 6:
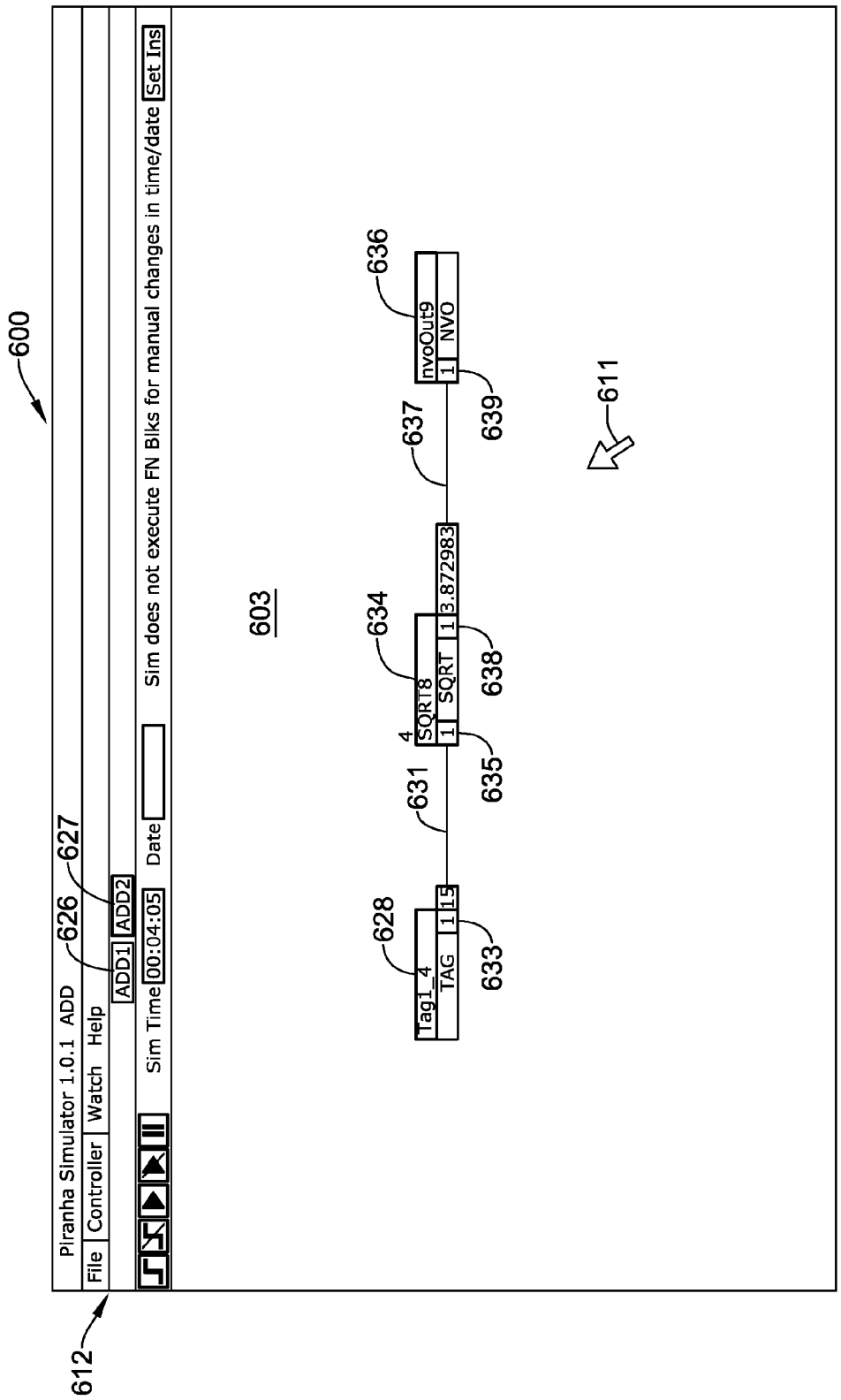
FIG. 6 shows a second page of the screen of FIG. 5.
Figure 8:
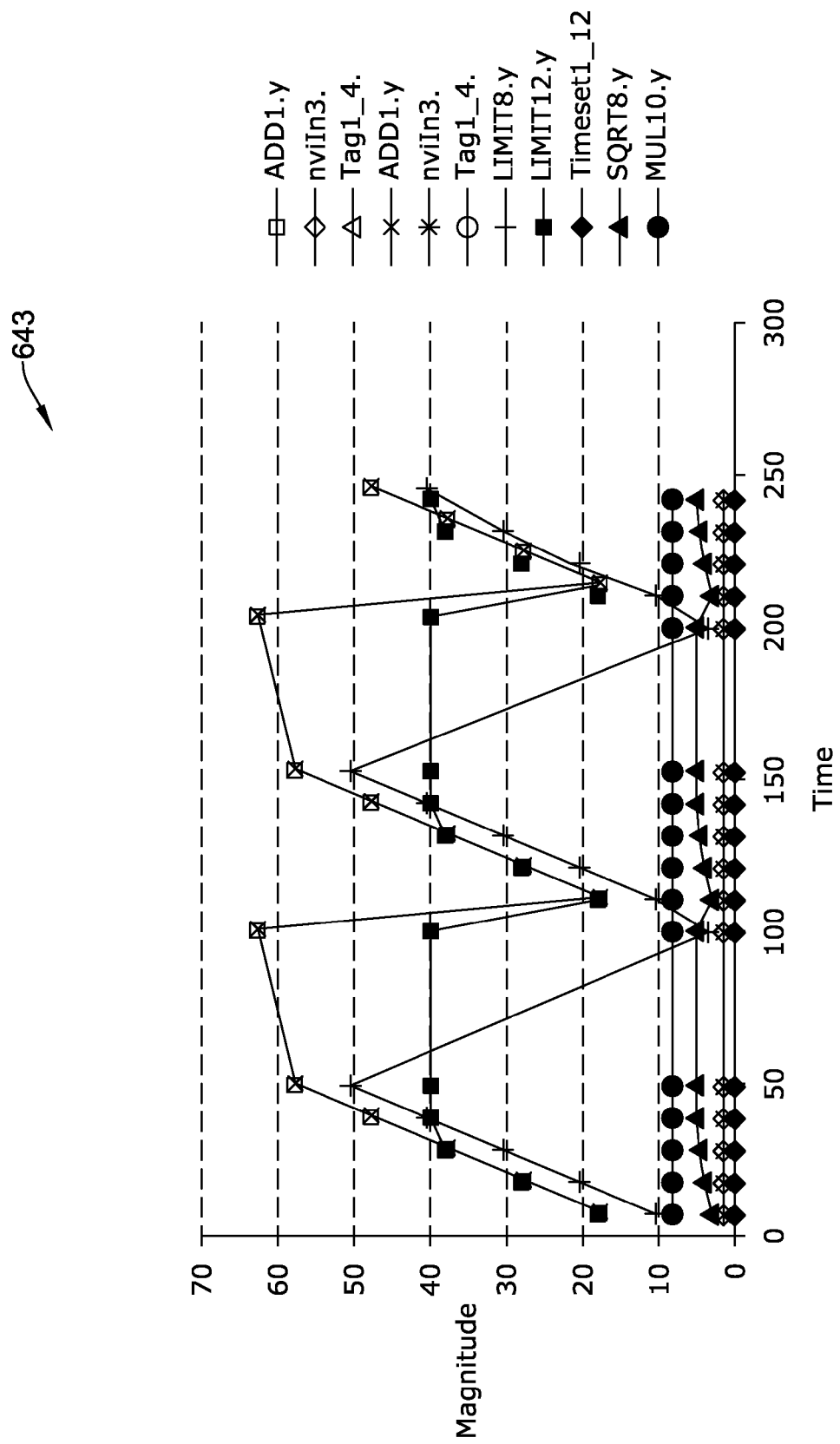
FIG. 8 is a graph of the data in the table in FIG. 7.

FIGS. 5 and 6 show the circuits of FIGS. 2 and 3, respectively, in a simulate mode which may be selected by clicking on "controller" of the tool bar 612 with the mouse arrow 611. Then "simulate" may be clicked on to put the designed circuit into an operational-like scenario. The label "watch" on the tool bar 612 may be clicked on to get the watch dialogue box 641. The loops and outputs along with their respective values may be listed in box 641. Also, values for each increment of time may be provided at the various output terminals of the function blocks. For example, a value of "25" is shown at the output terminal 621 of the limit function block 604. Units may be of time, magnitudes, or some other kind of measurement. The circuit or system, on pages ADD1 626 and ADD2 627 indicated on the tool bar 612, may include analog, digital or a combination of digital and analog function blocks. A simulation may run for various inputs may be recorded in a table 642 as shown in FIG. 7 and plotted as shown in a graph 643 of FIG. 8. Graph 643 shows magnitudes for various outputs versus time.

Figure 9:
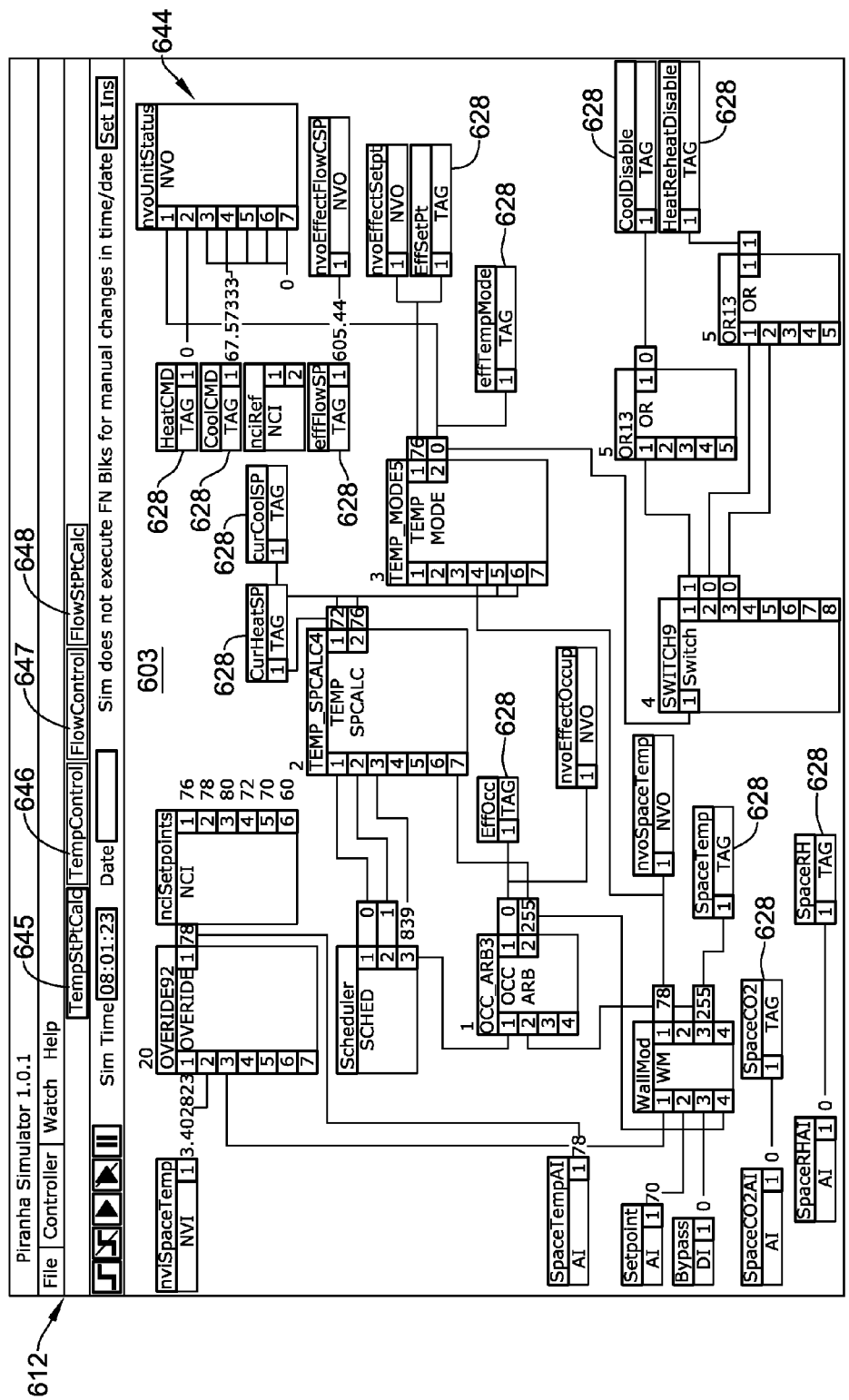
FIG. 9 shows a display screen with one of several pages showing a designed system have somewhat more complexity that the example circuit or system of FIGS. 2 and 3.

FIG. 9 shows a simulation mode of a somewhat intricate circuit 644 of function blocks. Tool bar 612 appears to show that this circuit 644 is one of four pages 645, 646, 647, and 648 of a larger combination of function blocks interconnected via tag connections 628.

Figure 10:
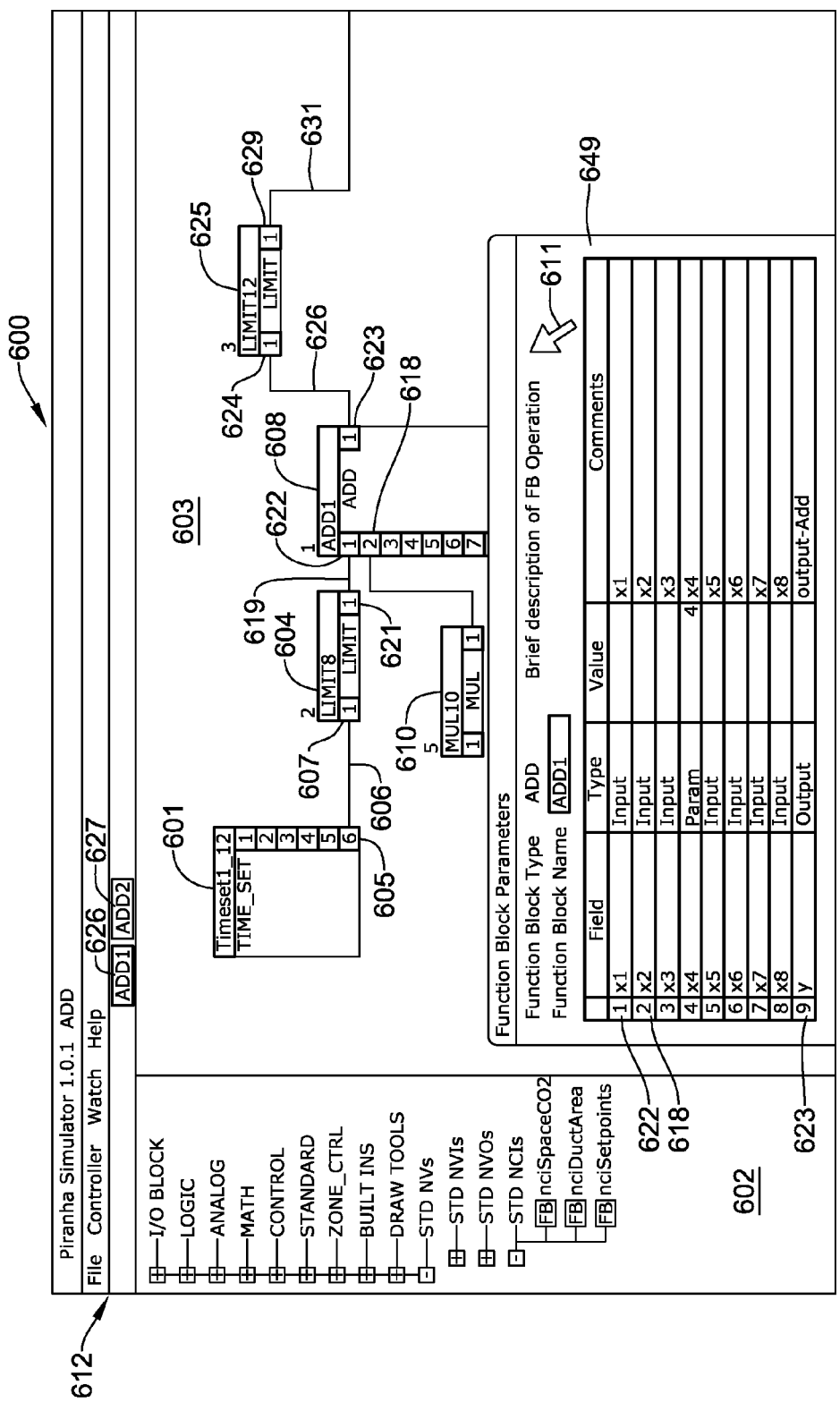
FIG. 10 shows a dialog box with inputs, a parameter and an output.

FIG. 10 shows a portion of the layout of the circuit in FIG. 3, but with a dialogue box 649 showing the inputs and output of the add function block 608, as discussed herein.

An illustrative example resulting from the present function block engine system may be a VAV (variable air volume) system used for reducing the air quantity under periods of limited or no occupancy and saves both energy of air delivery and the energy involved in the heating/cooling the air. The present VAV system has an ability to have high resolution of air flow and the accurate control to an air setpoint, especially at low flow volume. The VAV air flow calibration process or field balancing is a very important part of the product delivery that allows an HVAC balancer to measure the flow very accurately and max flow and min flow and enter an adjustment to the VAV control calibration. At the high end of accuracy and resolution, ten point curves detailing the air pressure (proportional to voltage) in relation to velocity air flow may be customized and developed for the manufacture of flow pickup devices. There appears to be a need to develop an approach that can incorporate the minimum flow and calibration information in addition to the ease required for an HVAC balancer.

Advantages of the system may include the following. Function block architecture allows flexibility to accommodate new architectures, hardware, or changes in HVAC equipment due to improvements in sequences, control strategies, or communication to achieve balancing. A modular system gives ease of understanding. There is efficient use of resources—vastly simpler for balancing algorithm to implement resulting in savings of time and hardware/software resources. It may take advantage of a high point calibration technique in the present assignee's U.S. Pat. Nos. 6,549,826 and 5,479,812. This technique appears as being recognized in industry as leading in flow accuracy and low cost. The present invention facilitates this technique in a much more simple and elegant way. U.S. Pat. No. 6,549,826, issued Apr. 15, 2003, is hereby incorporated by reference. U.S. Pat. No. 5,479,812, issued Jan. 2, 1996, is hereby incorporated by reference. U.S. Pat. No. 6,745,085, issued Jun. 1, 2004, is hereby incorporated by reference. U.S. Pat. No. 6,536,678, issued Mar. 25, 2003, is hereby incorporated by reference. U.S. patent application Ser. No. 10/809,115, filed Mar. 25, 2004, is hereby incorporated by reference.

The system may result in an ability to use multi-platform, multi-purpose programmable controller algorithms that can be adapted to, combined, merged, and/or synthesized with multi-protocols (TCP/IP/Ethernet, BACnet™, LON™, and so on), other applications (RTU, CVAHU, UV, FCU, VAVAHU, and so forth), internet (T7350H, XL15B, webserver) application (HVAC, boiler control per U.S. Pat. No. 6,536,678 owned by the present assignee) and industry (security, test, OEM, and so forth).

Figure 11:
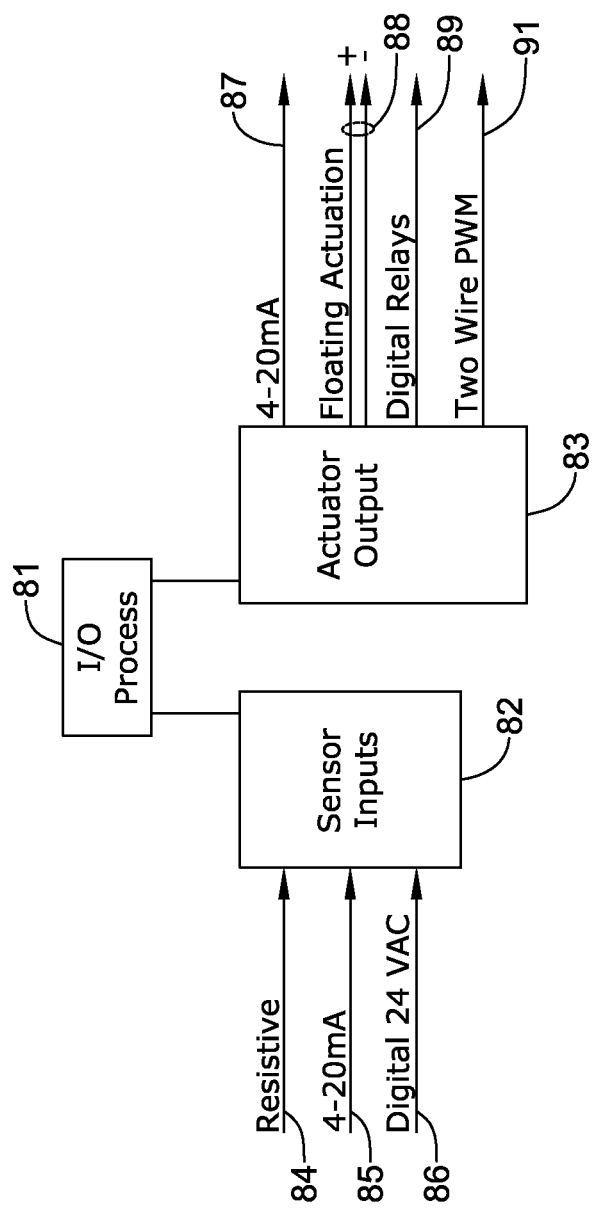
FIG. 11 is an input/output block diagram that may be associated with interacting with an operating system.

The may be an input/output processor module 81 that receives sensor inputs and provides actuator outputs. A sensor input module 82 may be connected to module 81. An actuator output module 83 may be connected to module 81. Inputs 84, 85 and 86 may receive resistive signals, 4-20 mA signals and digital 24 VAC signals, respectively. Other kinds of signals may be received by the inputs. Outputs 87, 88, 89 and 92 may provide signals for dampers, valves, and so forth. Outputs 87 may provide 4-20 mA signals. Output 88 may be a floating actuation of plus and minus signals of about 24 VAC to provide good resolution positioning of, for example, a damper at various angles relative to an air flow. Output 89 may provide digital relay signals and output 91 may be a two-wire PWM (pulse width modulated) signals. FIG. 11 is a diagram of modules 81, 82 and 83.

Figure 12:
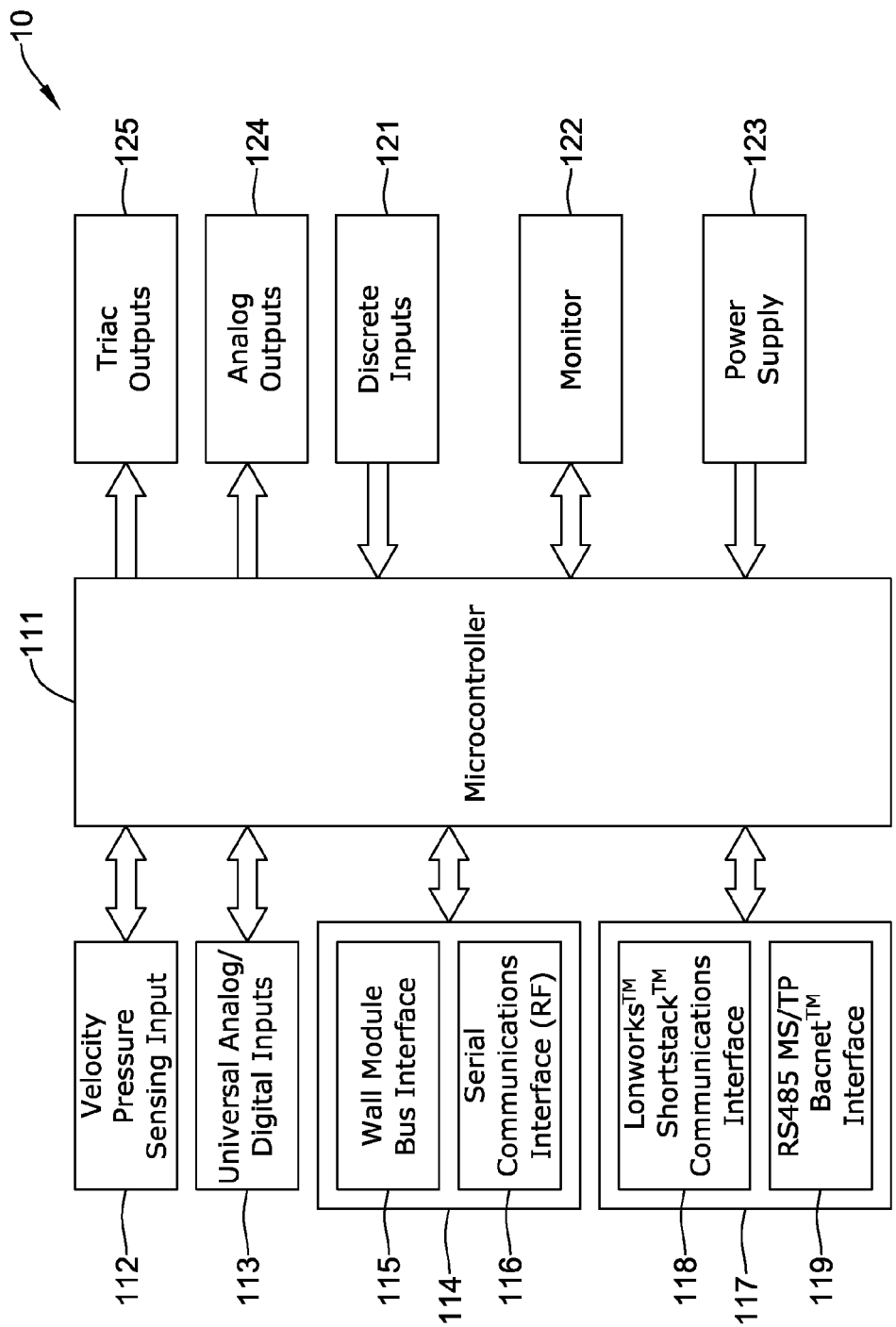
FIG. 12 is an overview block diagram of the present system with its interaction with a microcontroller.

FIG. 12 is an overview block diagram of the present system 10 with its interaction with a microcontroller. A central item may be a microcontroller module 111. Microcontroller module 111 may have one or more processors. Velocity pressure sensing input module 112 may be connected to microcontroller 111. Universal analog/digital inputs module 113 may be connected to module 111. An interface module 114, having a wall module interface 115 and a serial communications interface (RF) 116, may be connected to module 111. Another interface module 117, having a LonWorks™ ShortStack™ communications interface 118 and an RS485 MS/TP BACnet™ interface 119 may be connected to module 111. A discrete inputs module 121 maybe connected to module 111. A monitor 122 may be connected to module 111. A power supply module 123 may be connected to module 111. An analog outputs module 124 and a triac outputs module 125 may be connected to module 111. Other modules, as desired, may be provided and connected to microcontroller module 111.

Figure 13:
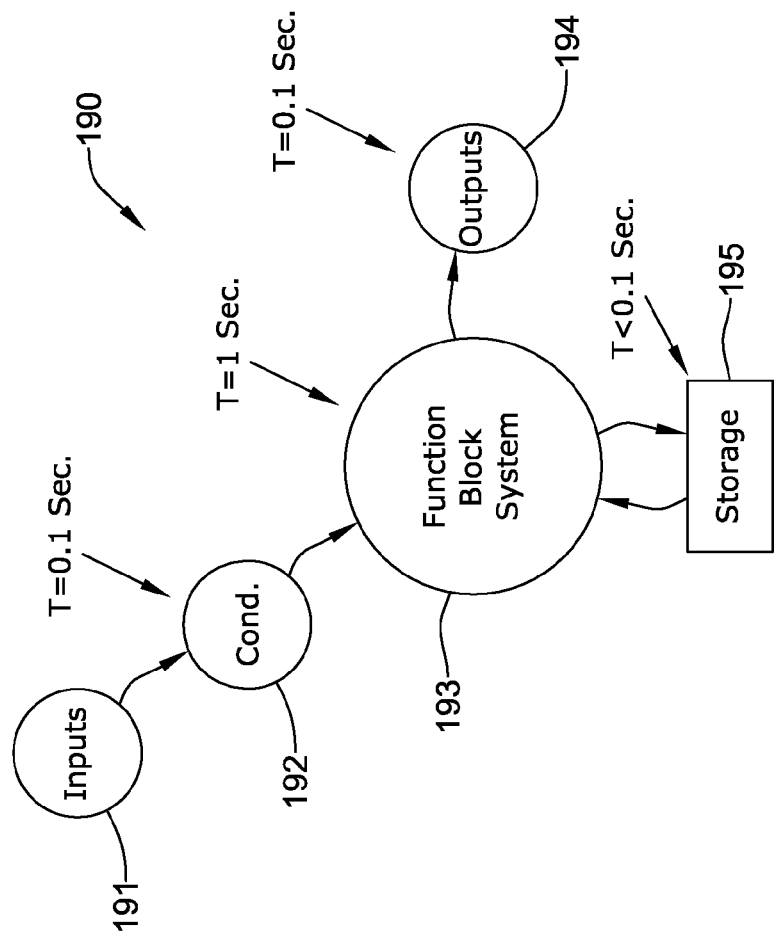
FIG. 13 shows a diagram of a balancing system and times for activity between the system and several other components.

FIG. 13 shows portions of a function block system 190 and their times for activity among them. For signals at inputs 191 to reach the function block system 193 via the conditioning 192 of the signals may take about 0.1 second. The time for the block system 193 to process the received signals may be about one second. To provide signals from the block system 193 to the outputs 194 may take about 0.1 second. The interaction of the block system 193 and storage or memory 195 may be significantly faster than 0.1 second.

Figure 14:
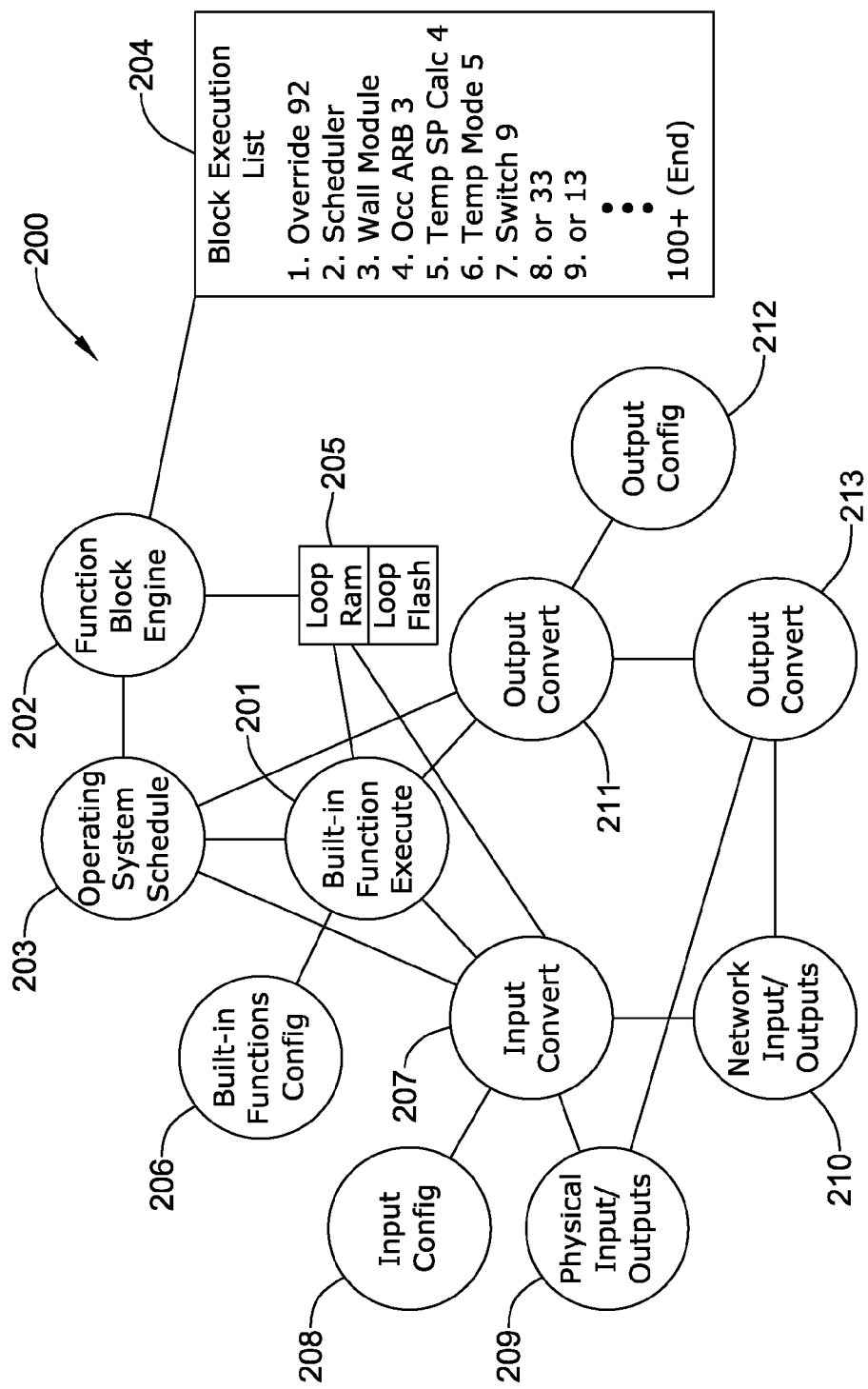
FIG. 14 is a diagram of a function block system.

FIG. 14 is a diagram of a function block system 200 which may have application to the balancing or other system. Built-in function execute 201 may be connected to operating system schedule 203, loop RAM/FLASH 205, built-in functions configuration 206, input converter 207, and output converter 211. Function block engine 202 may be connected to operating system schedule 203, block execution list 204, and loop RAM/FLASH 205. Operating system schedule 203 is connected to input converter 207 and output converter 211. Input converter 207 is connected to loop RAM/FLASH 205, input configuration 208, physical input/outputs 209, and network input/outputs 210. Output converter 211 is connected to output configuration 212 and output converter 213. Output converter 213 is connected to physical input/outputs 209 and network input/outputs 210.

Figure 15:
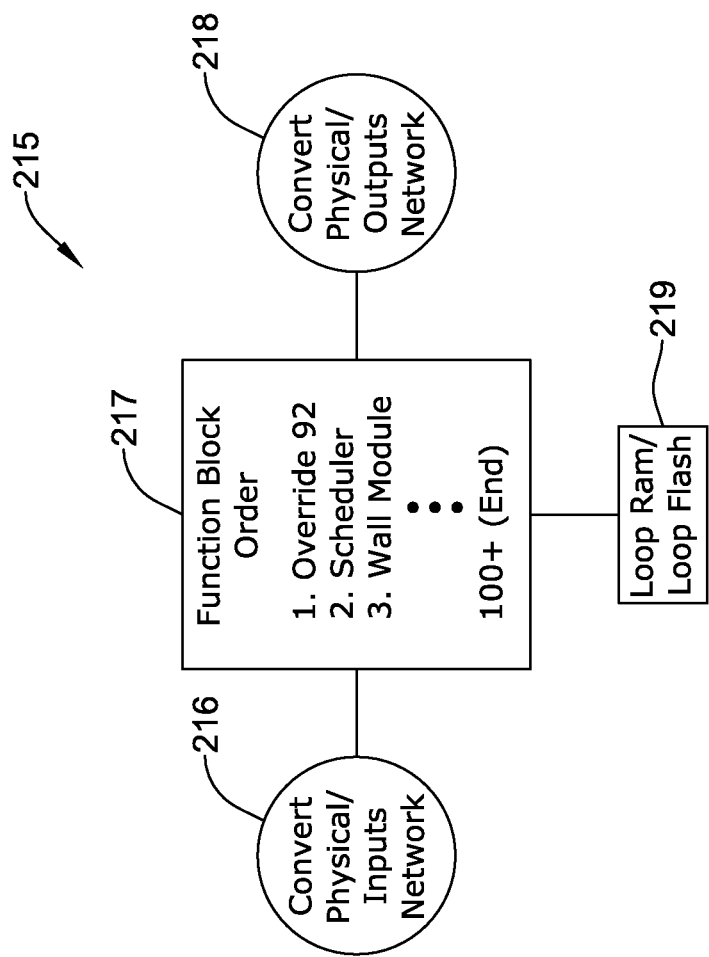
FIG. 15 is a summary variable air volume block flow diagram.

FIG. 15 is a summary VAV block flow diagram 215. A convert physical/inputs network 216 may be connected to a function block order list 217. The function block order list 217 may be connected to a convert physical/outputs network 218 and to a loop RAM/FLASH 219.

Figure 16:
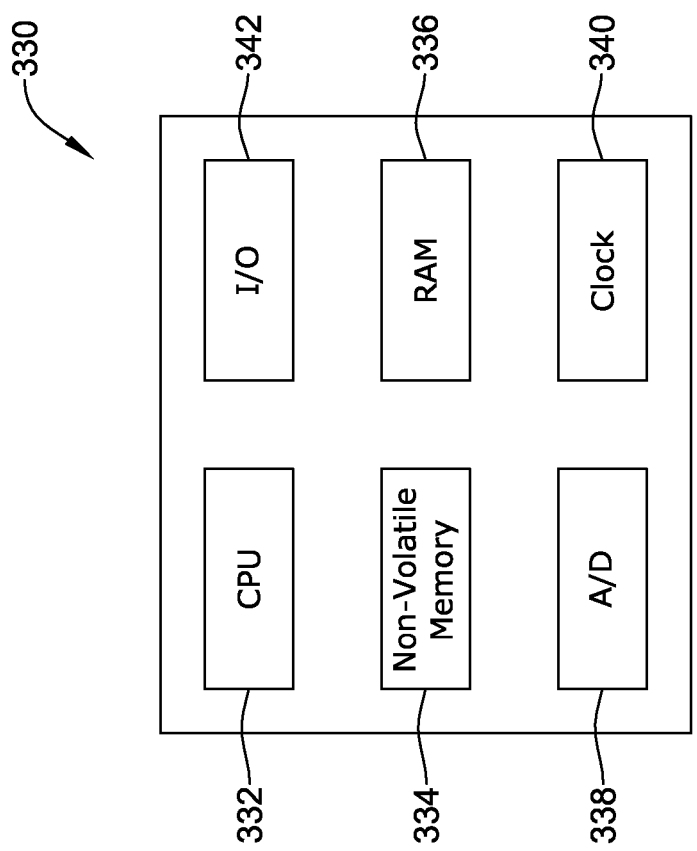
FIG. 16 is a block diagram of an illustrative programmable HVAC controller.

FIG. 16 is a block diagram of an illustrative programmable HVAC controller. The illustrative HVAC controller may be a programmable thermostat, or may be separate from the thermostat. In either case, the HVAC controller may provide one or more control signals that effect the operation of the HVAC system.

The illustrative HVAC controller may include a microcontroller 330 having a non-volatile memory 334 and a random-access memory (RAM) 336. Additionally, the illustrative microcontroller 330 may include a central-processing unit (CPU) 332, analog-to-digital converters (A/D) 338, input/outputs (I/O) 342, and a clock 340 or timer. The illustrative microcontroller 330 may include more or less than these illustrative components, depending on the circumstances. As illustrated, the aforementioned components may be provided internal to the microcontroller 330 without the need for any external components, but this is not required.

In some cases, the least expensive form of processor is a microcontroller. Microcontrollers typically contain all the memory 334 and 336 and I/O 342 interfaces, integrated on a single chip or device (e.g., microcontroller) without the need for external components. As noted above, one advantage of using a microcontroller 330 is the low cost when compared to the cost of a typical microprocessor. Additionally, microcontrollers 330 may be designed for specific tasks, such as HVAC tasks, which can help simplify the controller and reduce the number of parts needed, thereby further reducing the cost. While the use of a microcontroller may have some benefits, it is contemplated that the present system may be used in conjunction with a microprocessor or any other suitable controller, as desired.

In the illustrative microcontroller 330, the non-volatile memory 334 may be FLASH memory. However, it is contemplated that the non-volatile memory 334 may be Read Only Memory (ROM), programmable Read Only Memory (PROM), Electrically Erasable Programmable Read Only Memory (EEPROM), Random Access Memory (RAM) with a battery back-up, or any other suitable non-volatile memory 334, as desired. In the illustrative example, the amount of FLASH memory may be less than 100 Kb. In one case, the amount of FLASH memory may be about 60 Kb; however, it is contemplated that any amount of FLASH may be used depending on the requirements per application.

In some illustrative examples, the non-volatile memory 334 may be configured to have at least two portions including a first portion that is the equivalent of ROM and a second portion that is the equivalent of EEPROM. The first portion of non-volatile memory 334, often called the firmware portion, may be used to store at least in part one or more execution modules, such as, for example, a function block engine. In some cases, this portion of the non-volatile memory 334 may be programmed at the factory, and not subsequently changed. Additionally, the one or more execution modules (e.g., function block engine) stored in the firmware portion may execute, in some cases, one or more function blocks also stored in the non-volatile memory 334.

The second portion of the non-volatile memory 334 may include application configuration modules or data, including for example, a block execution list. In some cases, the non-volatile memory 334 in this second portion may be divided further to contain segments of data. This portion of the non-volatile memory 334 may be capable of being reconfigured post factory, such as during installation of the controller into an HVAC system in a building or structure. In other words, in some illustrative examples, the second portion of the non-volatile memory may be field programmable. In some cases, the amount of non-volatile memory 334 allotted for the second portion may be about 5 Kb. However, it is contemplated that any amount of field programmable memory may be provided, as desired.

It is further contemplated that the non-volatile memory 334 may also have a portion dedicated for the storage of constant values. This portion of memory may be provided in, for example, the firmware portion and/or the field programmable portion, as desired.

In the illustrative microcontroller 330, the RAM 336 may be used for variable storage. In some cases, the RAM 336 may be a relatively small repository for exchanging information during execution of the one or more programs or subroutines stored in the non-volatile memory 334. The RAM 336 may also be used for hosting the operating system of the microcontroller 330 and/or the communication capabilities, such as external interfaces. In the illustrative microcontroller 330, the amount of RAM 336 included may be about 5 Kb or less, 2 Kb or less, or any other suitable amount of RAM. In some cases, the operating system and communication capabilities may consume about 1 Kb of RAM 336, leaving about 1 Kb for other functions, such as storing variables and/or other data for the one or more programs.

The CPU 332 for the illustrative microcontroller 330 may interpret and execute instructions, and may control other parts of the microcontroller 330 as desired. In some cases, the CPU 332 may include a control unit and an arithmetic-logic unit contained on a chip. The clock 340 can provide a steady stream of timed pulses for the microcontroller 330, which may be used, for example, as the internal timing device of the microcontroller 330 upon which operations may depend. The I/Os 342 can transfer data to and from the microcontroller 330 and an external component. In some cases, for each input, there may be a corresponding output process and vice versa. The A/D 338 converter can provide transformations of an analog input into a digital input format helping to enable the microprocessor to be able to read and interpret analog input signals. In some cases, a D/A converter may also be provided to allow digital signals to be provided as analog outputs, if desired.

Figure 17:
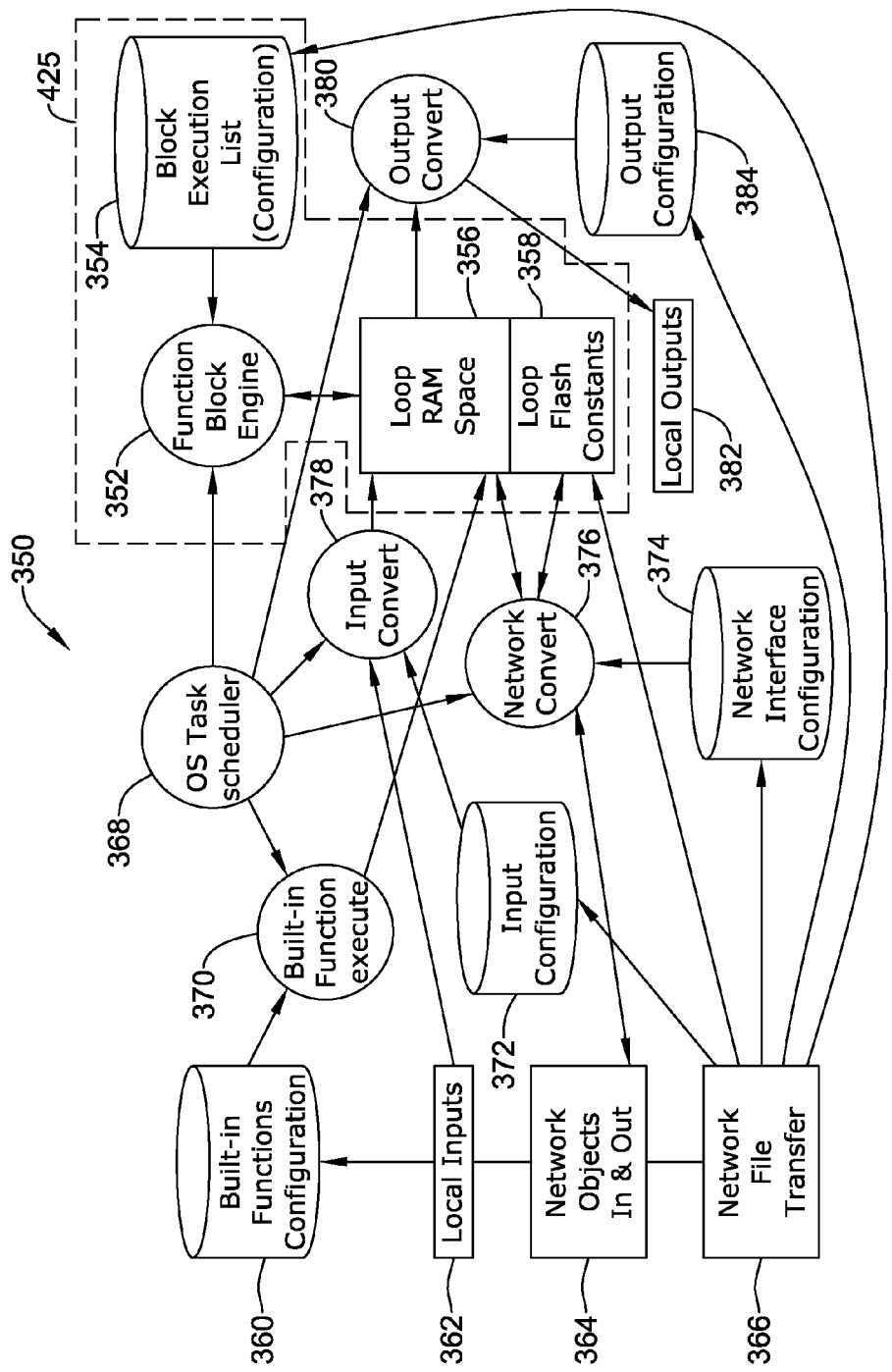
FIG. 17 is a schematic diagram of an illustrative application framework of a programmable controller.

FIG. 17 is a schematic diagram of an illustrative application framework of a programmable controller 350. The illustrative controller 350 includes one or more execution modules, one or more application configuration modules, and a parameter and variable storage space. The execution modules, as illustrated by the circles in FIG. 17, can include a function block engine 352, a built-in function execute module 370, an input convert module 378, a network convert module 376, and an output convert module 380. The application configuration modules, as illustrated by the cylinders, can include a block execution list 354, a built-in functions configuration 360, an input configuration 372, a network interface configuration 374, and an output configuration 384. The parameter and variable storage space can include a loop RAM space 356 and a loop flash constant space 358. Additionally, the illustrative controller 350 may include one or more external interfaces for communication capabilities, including a local input 362, a network file transfer 366, a network object in and out 364, and a local output 382. In some cases, the controller 350 may also include an operating system (OS) task scheduler 368.

The one or more execution modules can be resident in the non-volatile memory of the microcontroller 350, such as in FLASH memory. More specifically, in some cases, the one or more execution modules may be resident in the ROM equivalent or firmware portion of the non-volatile memory. At least one of the execution modules may include one or more programs, some of the one or more programs relating to the operation of the HVAC system. The one or more programs may include a set of sub-routines that the one or more execution modules can sequentially execute. The one or more execution modules may execute the one or more programs from the non-volatile memory.

The one or more application configuration modules can also be resident in the non-volatile memory, such as the FLASH memory, of the microcontroller 350. More specifically, the one or more application configuration modules can be resident in the EEPROM equivalent or the field programmable portion of the non-volatile memory. These modules can be pre-configured for standard HVAC applications or can be configured for custom HVAC applications, as desired. Additionally, the one or more application configuration modules can be field programmable. For example, in some cases, the one or more application configuration modules may be programmed and configured either during or after the installation of the controller into a HVAC system.

In some cases, the one or more application configuration modules can include a block execution list 354. The configuration of the block execution list 354 can direct the execution of the one or more execution modules (e.g., function blocks). In some cases, this configuration can be determined by the user or the installer. In some cases, a programming tool may be used that allows the installer to select the appropriate function blocks to create a custom block execution list 354, along with the appropriate configurations, to perform specific HVAC applications. This may help the one or more application configuration modules to be configured on a job-by-job basis, which in turn, can direct the execution of the execution modules on a job-by-job basis. In some cases, the one or more application configuration modules can include parameters or references that point to a location in memory for data, such as to the parameter and variable storage space.

The parameter and variable storage space may be provided in the controller 350 for the one or more execution modules and/or one or more application configuration modules to reference data or values to and from storage space. In an illustrative example, the variable parameter storage space, or loop RAM space 356, may be resident in RAM. This storage space can be used for the temporary storage of variables or parameters, such as function block outputs and/or temporary values from inputs, either local inputs or network inputs, of the controller 350.

Also, in the illustrative example, the constant parameter storage space, or loop flash constants 358, may be a storage space for storing constant values determined by the programmer or user. This storage space may be resident in non-volatile memory, such as the FLASH memory. Certain set points and operational parameters may be designated as constant parameter values selected by the application designer, installer, or user, and may be stored in the loop flash constants 358 storage space, if desired.

The HVAC controller 350 may also include external interfaces, such as local inputs 362 and local outputs 382. The local inputs 362 may be stored according to the input configuration 372 module executed by the input convert module 378. These modules may direct to storage the input value so that it can be used by other execution modules, such as the function block engine 352. The local outputs 382 may be configured according to the output configuration 384 as executed by the output convert module 380. This may output the value or data to an external HVAC component, such as a damper, thermostat, HVAC controller, or any other HVAC component as desired.

The OS task scheduler 368 may determine the operation and execution of the execution modules within the HVAC controller 350. For example, the execution modules may be executed in the following order: discrete inputs; including input convert 378 and network convert 376; built-in function execution 360; function block execution 352; physical output processing 380; and finally network output processing 376. However, it is contemplated that any suitable order may be used as desired.

Figure 18:
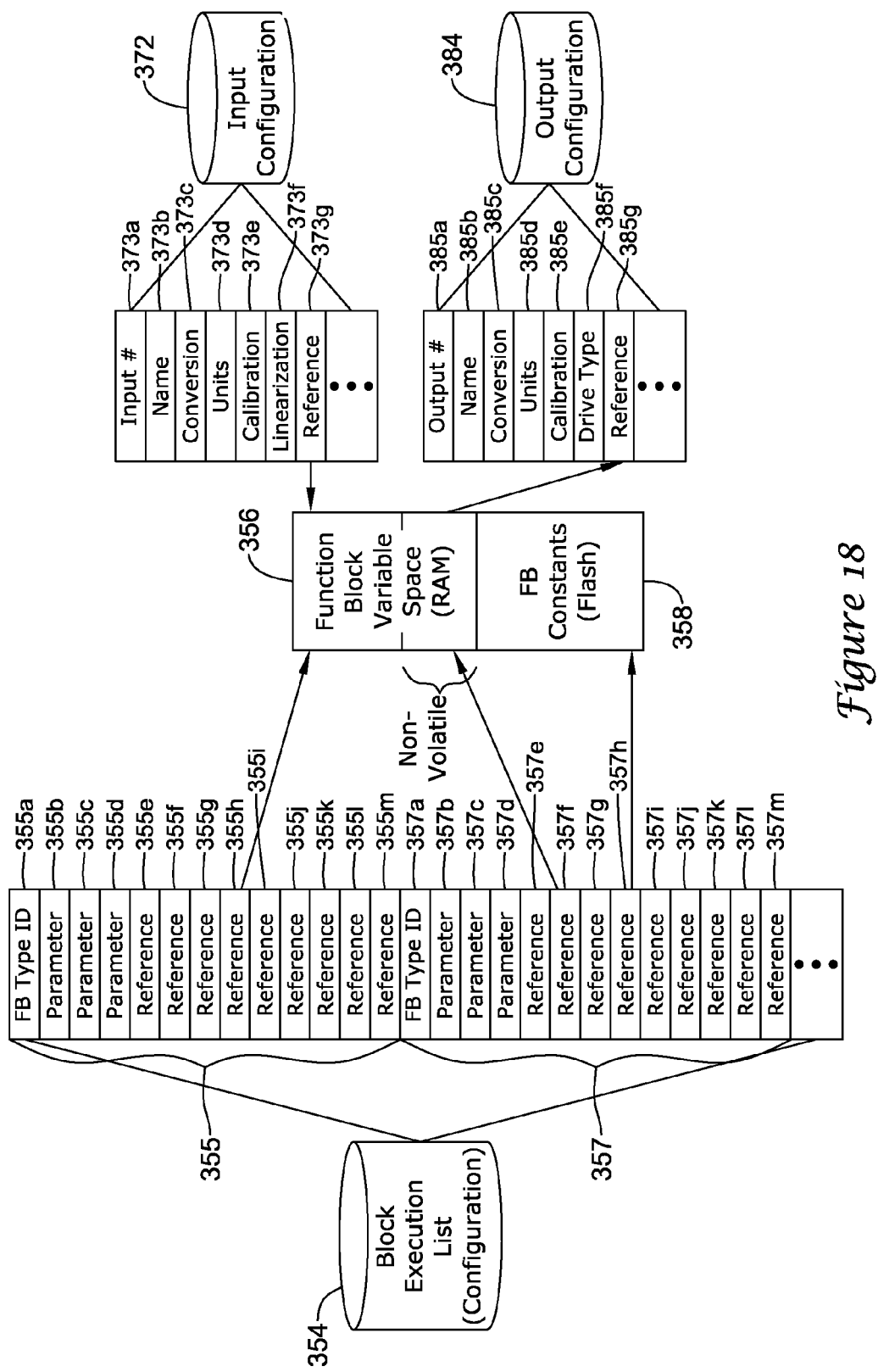
FIG. 18 is a schematic diagram of illustrative application configuration modules.

FIG. 18 is a schematic diagram of some illustrative application configuration modules of FIG. 17, including an illustrative block execution list 354. As indicated above, the block execution list 354 may be resident in non-volatile memory, such as FLASH memory, and more specifically the field programmable portion of the FLASH memory, if desired. The illustrative block execution list 354 includes a listing of one or more function blocks 355 and 357, and is used to direct which function blocks and the order of execution of the function blocks, executed by the function block engine 352 according to its configuration.

The block execution list 354 may be programmed at the factory or by the user or the installer, to configure the order and type of function blocks 355 and 357 that are to be executed for the particular application. In some cases, the user or installer can have a programming tool that allows the user or installer to select the appropriate function blocks 355 and 357 and configuration to perform the desired tasks for the particular application. Thus, in some examples, the block execution list 354 configuration may be provided on a job-by-job basis for the controller. In some cases, this can allow the block execution list 354 to be programmed and configured in the field and changed depending on the desired application and function of the controller.

In the illustrative example, the Function blocks 355 and 357 are modules that perform a specific task by reading inputs, operating on them, and outputting one or more values. The function block 355 and 357 can be defined according to the block execution list 354, which can be programmed by the factory, user, installer, or application designer. In the illustrative example, function blocks 355 and 357 may be classified into six categories: analog function blocks, logic function blocks, math function blocks, control function blocks, zone control function blocks, and data function blocks.

The function blocks 355 and 357 may perform higher level functions, such as higher level functions for HVAC operations. Additionally, the controller may include some more generic function blocks for performing some basic applications, but, in many cases, these may be combined with other function blocks to perform higher level HVAC application.

Referring back to FIG. 18, function blocks 355 and 357 may include a number of function calls or pointers to particular locations in memory. In the illustrative example, each function block 355 and 357 may include a function block type 355*a* and 357*a*, and a number of parameter or references 355*b-m* and 357*b-m*. The references and parameter 355*b-m* and 357*b-m* may point to variables or constants that are stored in the parameter and variable storage space, such as in either the function block variable space 356 or the function block constant space 358. Additionally, in some cases, the reference and parameters 355b-m and 357b-m may relate to other function block outputs, inputs (either local or network), or pointers to any other data, as desired.

In one illustrative example, each function block may be about 22 bytes long. Each function block may include the function block type 355a and 357a, which can be one byte. Each function block can also include nine references or variables 355e-m and 357e-m, each reference or variable being allocated 2 byte WORD increments, totaling 18 bytes. Also, each function block 355 and 357 may include three parameter or configurations 355b-d and 357b-d, each being one byte, totaling 3 bytes. However, these sizes are merely for illustrative purposes and it is not meant to be limiting in any way.

It is contemplated that any size function blocks 355 and 357 may be used, and/or any number or size of function block types 355a and 357a, references or variables 355e-m and 357e-m, and parameters or configurations 355b-d and 357b-d. Furthermore, it is contemplated that the order may be the function block type 355a and 357a, then one parameter 355b and 357b, then the nine references 355e-m and 357e-m, and then the two remaining parameters 355c-d and 357c-d. More generally, it is contemplated that the function blocks 355 and 357 may be configured in any order and have any number of references and parameters, as desired.

The function block type 355a and 357a may be used to specify what function the function block 355 and 357 performs. Examples of functions that function block types 355a and 357a can perform may include, but are not limited to, one or more of: determining a minimum; determining a maximum; determining an average; performing a compare function; performing an analog latch function; performing a priority select function; performing a hysteretic relay function; performing a switch function; performing a select function; performing an AND/NAND function; performing an OR/NOR function; performing an exclusive OR/NOR function; performing a one shot function; performing an add function; performing a subtract function; performing a multiply function; performing a divide function; performing a square root function; performing an exponential function; performing a digital filter function; performing an enthalpy calculation function; performing a ratio function; performing a limit function; performing a reset function; performing a flow velocity calculation function; performing a proportional integral derivative (PID) function; performing a adaptive integral action (AIA) function; performing a stager/thermostat cycler function; performing a stage driver function; performing a stage driver add function; performing a rate limit function; performing a variable air volume (VAV) damper flow control function; performing an occupancy arbitrator function; performing a general set point calculator function; performing a temperature set point calculator function; performing a set temperature mode function; performing a schedule override function; performing a run time accumulate function; performing a counter function; and performing an alarm function. More generally, any suitable function may be performed by function block types 355a and 357a, as desired.

Function block references 355e-m and 357e-m may be pointers to variables that can specify inputs, outputs and/or other data that is used by the function block 355 and 357. These variables may include data inputs that are used by the function block 355 and 357 during execution. In the illustrative example, there may be a number of variable type references that may each have a unique mapping to a memory class. In the illustrative example shown in FIG. 18, there are nine different types of variables: input, parameter, input/parameter, parameter/input, output floating point number, non-volatile output floating point number, output digital, static floating point number, and static digital. The input variables may include an input reference for the function block 355 and 357 stored in, for example, RAM memory. The parameter variable may be a value for the function block 355 and 357 to use, which in some cases, can be stored in either RAM or FLASH memory. The input/parameter variable can be a reference to either an input or a parameter, with the default being an input and may, in some cases, be stored in either FLASH or RAM memory. The parameter/input variable can be either a parameter or an input with the default being a parameter, and in some cases, can be stored in FLASH memory. The output floating point number variable may be an output of the function block 355 and 357, which can be called up as an input to another function blocks that is later executed. In some cases, the output floating point number variables may be stored in volatile RAM memory. The nonvolatile output floating point number variable may be an output of the function block 355 and 357, which can be called up as an input to another function block. In some cases, nonvolatile output floating point number variables may be stored in non-volatile RAM memory so that it retains its value on a power outage. The output digital variable may be an output of the function block 355 and 357 that can be called up as an input to another function block. In some cases, the output digital variables may be stored in RAM memory. The static floating point number variable may allow a function block 355 and 357 to use floats as static RAM variables. The static digital variable may allows a function block 55 and 57 to use digitals as static RAM variables. Additionally, there may be unused references, indicating that these references/variables are unused. More generally, it is contemplated that there may be any number of variable type references, as desired.

The output of function blocks 355 and 357 can be stored, in some cases, in the RAM for later use by the function block engine. As indicated above, and in some cases, the outputs of a function block 355 and 357 can be used as an input reference to another function block 355 and 357. Additionally, in some cases, outputs can be referenced to the input of the same function block 355 and 357, when appropriate. However, if an input is referenced to its output, there may be a delay before receiving the output signal at the input of the function block (e.g., by one cycle or iteration) due to the sequential execution of the function blocks in one illustrative example. In some cases, it may take about one second for the execution of the function blocks 355 and 357, but this should not be required.

The parameters 355b-d and 357b-d may include design time configuration information needed by the function block 355 and 357 to execute. For example, the parameters 355b-d and 357b-d may instruct a corresponding function block 355 and 357 on how to initialize itself. In the illustrative example, each function block 355 and 357 may have three parameters 355b-d and 357b-d, each including one byte of configuration information, for this purpose. However, it is contemplated that any suitable number of parameters of any suitable size may be used, as desired. In some cases, the parameter information may be entered by the application designer, the installer in the field, or the user, as desired. The parameters 355b-d and 357b-d may be configured to apply to just one specific function block type, one specific function block instance, or multiple function blocks, depending on the application. In some cases, the parameters 355b-d and 357b-d may be stored in the function block constants storage space 358, but this should not be required.

The function block variable space 356 and the function block constant space 358 may be provided in the controller. For example, the function block variable space 356, which may change, may be resident in RAM memory of the controller. In some cases, the RAM may have a portion that is volatile and a portion that is non-volatile. In the volatile RAM, upon a power disruption, the data may be lost or reset, whereas in the non-volatile RAM, upon a power disruption, the data should be retained. Thus, data that is desirable to maintain upon a power disruption may be stored in the non-volatile RAM, while other data may be stored in the volatile RAM.

The function block constant space 358 may be a constant value storage space for data, such as parameters, as determined by the application designer, installer or user. The constant value storage space may be resident in non-volatile memory, such as FLASH memory. This may include certain set points and operational parameters that are designated as constant parameter values selected by the application designer at design time, by the installer, or the user. In order to change a constant parameter, and in some cases, a new function block configuration may have to be downloaded to the controller. Additionally, in some cases, a function block description, which may be available to the user, programmer, and/or installer, can provide details as to which parameters are variable and which are fixed. Providing the function block constant space 358 may help improve the efficiency of the controller by maintaining parameters and/or variables that could be used by the function blocks 355 and 357.

External interfaces, such as the network input/output and local input/output may also use the function block 355 and 357 variable space to map data in and out of the controller. To input data into the controller, an input configuration 372 may be provided to properly configure the input so that the function blocks identified in the block execution list 354 may properly reference the data. In some cases, the input configuration 372 may include an input number 373a, name 373b, conversion 373c, units 373d, calibration 373e, linearization 373f, and references 373g. The input reference may map the input to the function block variable space 356 resident in the RAM memory. An output configuration 384 may also be provided to configure outputs that may be mapped out of the controller. The output configuration 384 may include an output number 385a, name 385b, conversion 385c, units 385d, calibration 385e, drive type 385f, and references 385g. The output reference may map data from the function block variable space 56 resident in the RAM.

Figure 19:
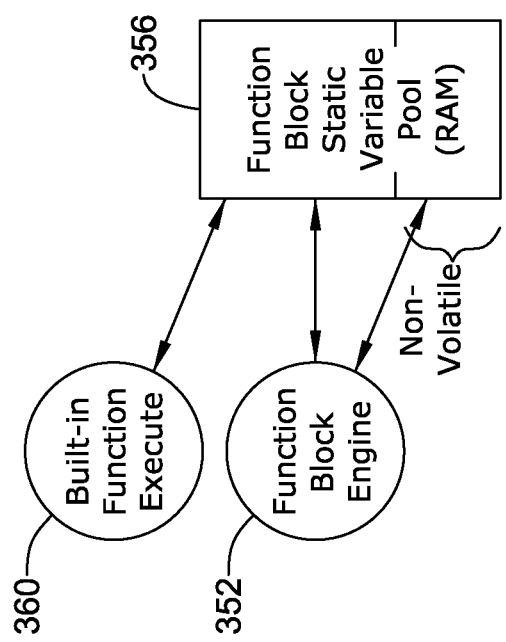
FIG. 19 is a schematic diagram of one or more execution modules including a function block engine.

FIG. 19 is a schematic diagram of the illustrative one or more execution modules of FIG. 17 including the function block engine 352. As discussed previously, the function block engine 352 may be resident in the non-volatile memory of the microcontroller, more specifically, in the firmware portion of the non-volatile memory. The function block engine 352 may include one or more programs, such as one or more HVAC application programs. The functional block engine 352 may be a set of sub-routines that can sequentially execute function blocks identified by the block execution list. In some circumstances, the function block engine 352 may execute the function blocks every second in the order provided by the block execution list.

During execution, the function block engine 352 may follow the block execution list of function blocks. This may include reading variables and/or parameters stored in the function block variable pool 356 and/or the loop flash constants 358, as directed by the function blocks and/or block execution list. The function block engine 352 may execute the function blocks from the non-volatile memory, such as FLASH memory, using the data read from the parameters and/or variables. In some cases, the function block engine 352 may also write values or data to the function block variable pool 356. In some cases, these written values are stored only temporarily in the function block variable pool 356 for use in the execution of other function blocks or as outputs of the controller.

The function block engine 352 may allow the application designer to program the controller to perform a wide variety of functions, such as HVAC functions. The function block engine 352 sequentially may execute each function block that the application designer has configured in the block execution list. In some cases, the inputs to the function blocks may be referenced from the function block variable pool 356 that may be resident in RAM. In some cases, there may only be a small stack space in the function block variable pool 356, which could be reused by the function blocks for local, temporary variable storage. Additionally, in some cases, local physical and network inputs may be provided with access to the variable space.

The built-in function configuration and execute block 360 may provide a means of translating inputs (both local and network), and providing the values as variables that can be used as inputs to any or selected function blocks. In other words, in some case, the function blocks may be unaware that an input to a function block came from a physical input, a network input, a parameter, or as an output from another function block. The input from the built-in function execute block 360 may be stored in the function block variable pool 356, in some cases only temporarily, for use by the function block engine 352.

The following is an approach for a balancing procedure for a configuration tool that may be used. First is a k factor method with the following steps: 1) Set nviFlowoverride from HVO_OFF_NORMAL (0) to HVO_Maximum (7); 2) Read nciMaxFlowCoolSP and nvoBoxFlowCool and compare; wait until the nvoBoxFlowCool is within 0.5% of the nciMaxFlowCoolSP; look at nvoCmdCoolDmpPos and monitor until changes stops for 5 seconds or direction changes; 3) Read nvoBoxFlowCool and nvoCmdCoolDmpPos for stability; average nvoVelSenPressC reading over a 5 sample window after stability is reached; if the Flow is unstable, ask the user, "Would you like to balance anyway?"4) Display apparent flow (nvoBoxFlowCool) and Display Current K Factor nciKFactorCool; show the new calculated K Factor based on the equation below and ask user to proceed with new calculated K factor; (K Factor) nciKFactorCool=(user entered measured Box Flow)/sqrt([5 sample average of nvoVelSenPressC]−nvoPressOffsetC); and 5) Set nviFlowOverride from HVO_Maximum (7) to HVO_OFF_NORMAL (0); (optional) check minimum flow if desired.

Next is a min/max method with the following steps: 1) Set nviFlowOverride from HVO_OFF_NORMAL (0) to HVO_Maximum (7); 2) Read nciMaxFlowCoolSP and nvoBoxFlowCool and compare; wait until they are within control range of algorithm; look at nvoCmdCoolDmpPos and monitor until changes stops for 5 seconds or direction changes; 3) Read nvoBoxFlowCool and nvoCmdCoolDmpPos for stability; average nvoVelSenPressC readings over a 5 sample window after stability is reached; if the Flow is unstable, ask the user "Would you like to balance anyway?" 4) Display apparent flow (nvoBoxFlowCool) and request input for actual max flow; enter in value in nciMeasMaxFlowC; 5) Set nviFlowOverride from HVO_OFF_NORMAL (0) to HVO_Minimum(7); 6) Read nciOccMinFlowCSP and nvoBoxFlowCool and compare; wait until they are within control range of algorithm; look at nvoCmdCoolDmpPos and monitor until changes stops for 5 seconds or direction changes; if the Flow is unstable, ask the user "Would you like to balance anyway?" 7) Read nvoBoxFlowCool and nvoCmdCoolDmpPos for stability; average readings over a 5 sample window after stability is reached; if the Flow is unstable, ask the user, "Would you like to balance anyway?" 8) Display apparent flow (nvoBoxFlowCool) and request input for actual min flow; enter in value in nciMeasMinFlowC; and 9) Set nviFlowOverride from HVO_Minimum(7) to HVO_OFF_NORMAL (0).

The following presents a simple work bench arrangement of the required hardware and the associated wiring connections to configure Excel™ 10 W775D, F Controllers (by Honeywell International Inc.). One may proceed as in the following: 1) With power disconnected to the housing subbase, insert the controller circuit board (contained in the housing cover) into the subbase unit; 2) Apply power to the controller, and insert the Serial Interface cable into the jack on either the Excel 10 W7751D or F Controllers; 3) Use the CARE/E-Vision™ PC tools to configure the controller (See the CARE E-Vision™ User's Guides, forms 74-5587 and 74-2588, for further details), use the ID number sticker on the controller or press the bypass button on the wall module; 4) When configuration is completed, power down and remove the W7751D, F from the subbase, mark the controller with the Plant name or location reference so the installer knows where to install each controller in the building; 5) Repeat with next W7751D, F to be configured; and 6) The data file used for this configuration should be used at the job site so the commissioning data matches the controllers.

One may do configuring in the field. If the controllers were installed at the site, the procedure to assign the node numbers to the Excel™ 10 VAV Controller may be as in the following: 1) Instruct the installer to remove the ID sticker from each controller during installation and to affix it to either the job blueprint at the appropriate location or to a tabulated list, be sure the installer returns these prints to the application engineer after the controllers are installed; 2) Connect to the E-Bus with the CARE™ PC tool; and 3) Proceed to configure the W7751 (using the job prints for location reference for the controllers) by following the standard CARE™ procedures.

One may configure a Zone Manager. The Q7750A Excel™ 10 Zone Manager may send out a one-time LonWorks™ message containing its 48-bit Neuron™ ID after any power-up WARMSTAR™ or when the Excel™ 10 Zone Manager is reset by pressing the reset button. It may be important to note that pressing the reset button on the Excel™ 10 Zone Manager may cause all application files in the Q7751, including the C-Bus setup, to be lost. The LonWorks™ message is sent out one time and only on the E-Bus, not on the B-Port. The message may be the same as the one generated after pressing the service pin pushbutton available on Excel™ 10 VAV Controllers and also via the wall module bypass pushbutton. The CARE™ commission tool (E-Vision) can use this message to assign the node address.

The Assign ID procedure is the same as for an Excel™ 10 VAV Controller except, instead of pressing the bypass button, the reset button should be pressed or the power must be cycled (down then up) on the Q7750A Excel™ 10 Zone Manager.

The following is pertinent to Sensor Calibration. The space temperature and the optional resistive inputs may be calibrated. The wall module setpoint potentiometer can not necessarily be calibrated. One may perform the sensor calibration by adding an offset value (either positive or negative) to the sensed value using E-Vision™ menus (see E-Vision™ user's guide, form number 74-2588).

The following may be used in Air Flow Balancing for Pressure Independent applications. In addition to the ten point Flow Pickup Calibration Table, the Excel™ 10 VAV Controller may provide for 3-point (Maximum, Minimum, and Zero) Air Flow Calibration. This may allow the box to be adjusted so it can be certified that the box provides the flow rates specified by the consulting engineer. When balancing is complete, the actual flow from a box should be within 5 to 10 percent of the indicated air flow (as shown on the E_Vision™ screen). On may note that there are many sources of error in flow-hood measurements. Flow hood meters may typically attain accuracy to within plus or minus three to five percent of full flow. The error can be due to the device being out of calibration, or that it was last calibrated with a different style of diffuser. Even the operator technique may play a role in obtaining repeatable, accurate flow readings. When working with slotted diffusers, one should not use a hood, but rather use a velocity-probe type of instrument.

One may follow the diffuser manufacturer's recommendation for a procedure of how to best measure the air flow through their products. Prior to air flow balancing for the first time, perform a zero flow calibration procedure. To do so, power the Excel™ 10 VAV Controller for one hour or more before performing the procedure. Select the controller being worked on with E-Vision™ (see the E-Vision™ User's Guide, form 74-2588, for general details on using E-Vision). Due to inconsistencies in VGA display cards and modes, be sure to maximize the E-Vision™ window on the screen (by clicking the up-arrow at the top-right corner of the E-Vision™ window). This assures that all E-Vision activities are user viewable. Refer to the Air Flow balancing section in the E-Vision™ user's Guide form, 74-2588 for the exact procedure. As to resetting Air Flow Calibration to Factory Defaults, one may refer to the Air Flow Balancing section in the E-Vision™ user's Guide form, 74-2588 for the exact procedure.

A VAV Zeroing Procedure may include the following): 1) Manually command Damper to Closed Position; 2) Read nvoCmdCoolDmpPos until it has closed (See step 3 in K factor Balancing Procedure); 3) Command nviAutoOffsetC to true; 4) Command nviAutoOffsetC to false; and 5) Observe nvoPressOC has changed.

The present invention may permit a configuration algorithm to work with an efficient architecture dedicated to custom designed control functions to be connected and created and compile information in such a manner as to allow low cost microprocessors to accept the configuration and implement a fully programmable flexible HVAC controller in a very low resource environment. The present system may use efficient control functions that have fixed resource structures allocated through a separate compiler tool.

Part of the invention of the present system may be in the table, as to the function block piece. The representation may be on the screen. The function block list may be pre-existing. When one goes to simulate, then memory files may be generated.

Figure 20:
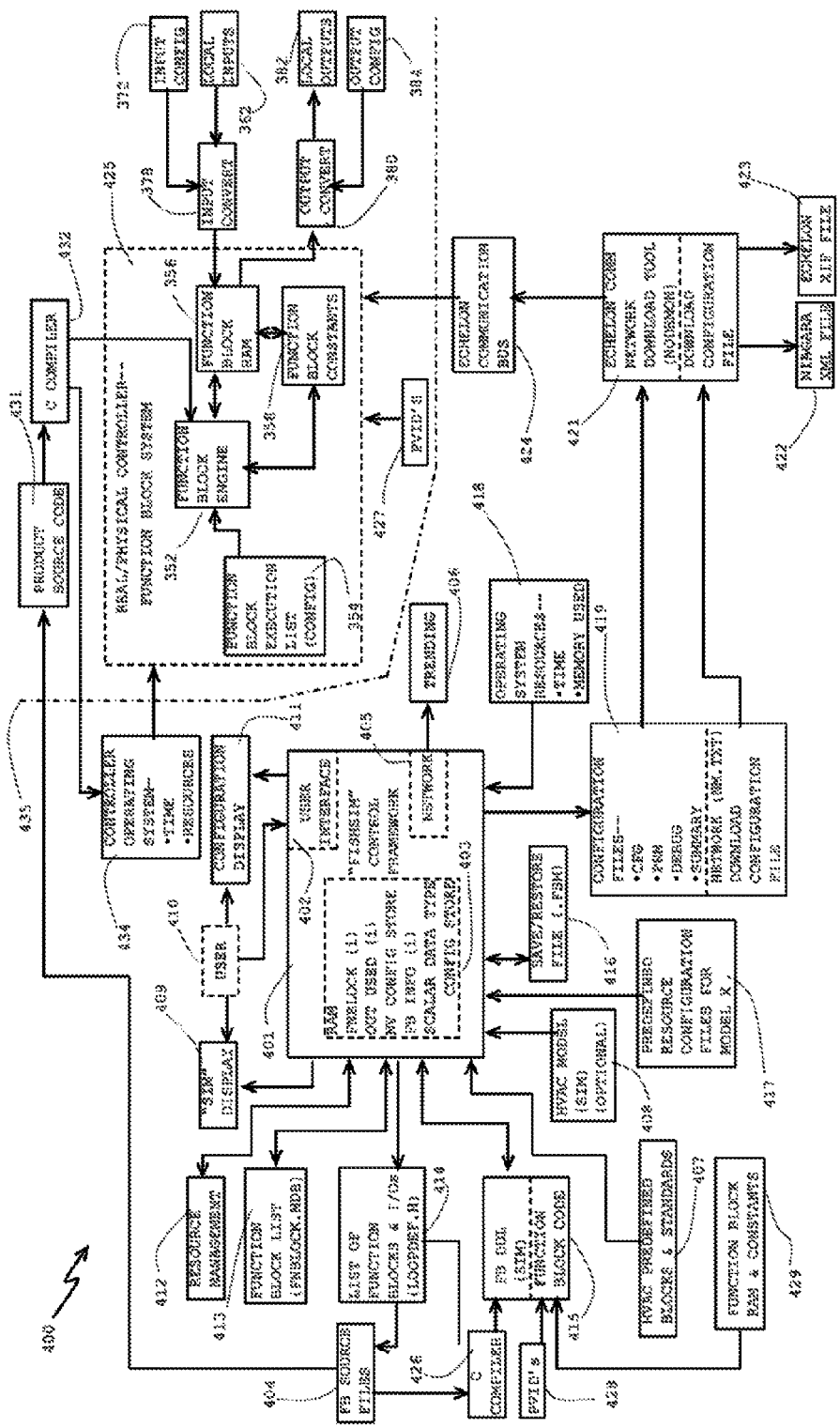
FIG. 20 is a diagram of a control system language compiler.

FIG. 20 is a diagram of a control system language compiler 400. A "fishsim" control framework 401 may have a user interface 402, and a storage RAM 403 with Fn Block (i), out used (i), nv configuration store, FB info (i), scalar data type configuration store, and more or less items depending on design specifics of system 400. Framework 401 may have a network 405 output of trending 406. Some information to an analog input may include HVAC predefined blocks and standards 407. Also, an optional HVAC model (sim) 408 may be an input to framework 401. An HVAC application of system 400 is for illustrative purposes. Predefined resource configuration files for model X module 417 may provide configuration information to control framework 401. Framework 401 may be connected to a save/restore file (.fsh) module 416.

The user interface 402 may have inputs from a user 410. The user 410 may also work with a "sim" display 409 and a configuration display 411. User interface 402 may provide inputs to the configuration display 411 and "sim" display 409.

An operating system resources (time and memory used) module 418 may provide operating system (OS) resources to control framework 401. A resource management module 412 may output management information to the control framework 401. A function block list (fnblock.mdb) module 413 may provide function block information to framework 401. Also, module 413 may provide function block information to a list of function blocks and I/Os (loopdef.h) module 414 via framework 401. An output of related information from module 414 may go to a function block source files module 404 which provide an output to C or other kind of compiler 426. An output of the C compiler 426 may go to an FB DDL (sim) portion of module 415. Module 415 may exchange function block information with control framework 401. A PVID module 428 may provide PVID's to a function block portion of module 415. Also, a function block RAM and constants module 429 may be connected to the function block code portion of module 415.

Control framework 401 may output configuration files, such those of cfg, prm, debug and summary, to a module 419. Also provided may be a network (nm.txt) download configuration file to module 419. An output from module 419 may go to a module 421. Information related to configuration files of module 419 may go to module 421 relating to the Echelon™ communication network download tool (nodemon). Information related to the network download configuration file of module 419 may go to the module 421 portion pertaining to the download configuration file. This configuration information of module 421 may go to a Niagara™ XML file 422 and/or an Echelon™ file 423. Also information relating to the download tool (e.g., "nodemon") from module 421 may go to a real/physical controller function block system module 425 via an Echelon™ communication bus 424.

The function block system module 425 may include a function block execution list (config) module 354 (see FIG. 17) having an output connected to a function block engine module 352. Module 352 may be connected to the function block RAM module 356 and to a function block constants module 358. Input information may be provided to the RAM module 356 from an input convert module 372. Output information may be provided to the constants module 358 from an output convert module 380. A controller operating system module 434 may provide time and resource management for the real/physical controller function block system module 425. Also, a PVID module 427 may provide PVID's to system module 425. The FB source files module 404 may provide an output to a product source code module 431. This output may be in the same code as the output to compiler 426. Module 431 may provide an output to a compiler 432. Compiler 432 may provide an output to controller operating system module 434 and an output to the function block engine of system module 425. Some or all of module 425 may be replicated in module 415. FB DDL (sim) of module 415 may be a key to success of a function block based design.

In FIG. 20, line 435 may show a separation between a fishsim tool on the left of line 435 and a function block system on the right side of the line. The tool permits a simulation of an operation of a designed system before it is put into a physical implementation as represented by the system on the right side of line 435. Memory and other resources may be shifted from the right side to the left side for reasons of economy.

Figure 21:
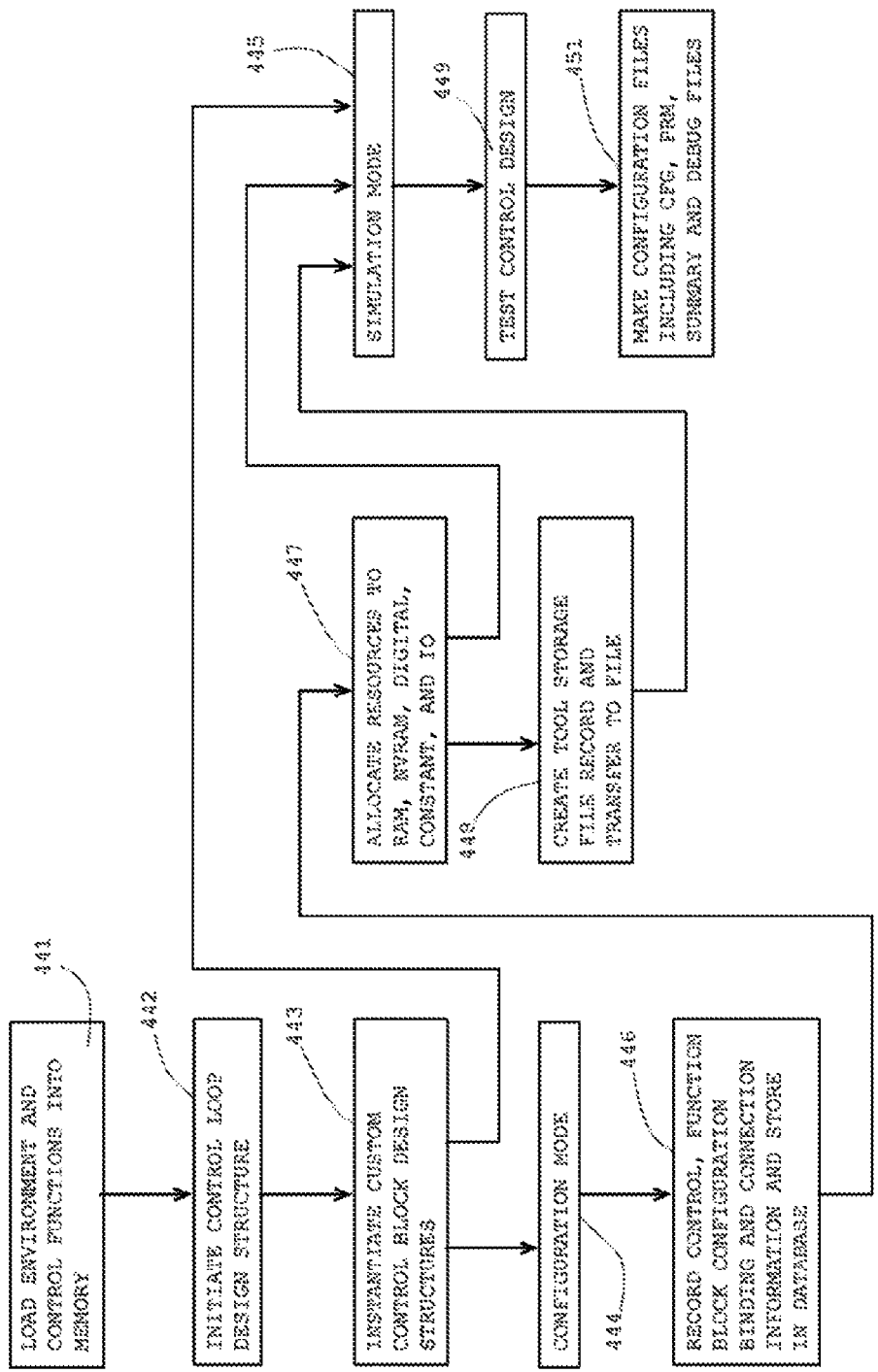
FIG. 21 is a diagram of activity related to the control system language compiler.

FIG. 21 is a diagram of activity related to the control system language compiler. It may start with a module 441 for loading environment and control functions into a memory. The loading of control functions may involve the function block list (FnBlock.mdb) of module 413 (FIG. 20) as a load. Also, predefined blocks and standards of module 407 and predefined resource configuration files for a model of module 417 (FIG. 20) may be considered for loading. Then a control loop design structure may be initiated at module 442. A list of possible function blocks for a menu on a left side of a screen may be unloaded from the mdb file of module 413, which also can contain information about configurations, non-configurations, ins, outs, changes, and so on. A spread sheet may be obtained from an mdb file. Going from module 442 to module 443, custom control loop or block design structures may be instantiated for an array of the spreadsheet. A FnBlock(i) array of the spreadsheet may be populated. Information for the array may include non-function blocks as well. At this point, one may go to a configuration mode module 444 where blocks are dragged on to a screen to form a design of a circuit or structure. As these blocks are dragged on and connected, relevant information about this design is filled into the spreadsheet. Function block and other pertinent information may be provided for a simulation operating system (e.g., an execution order) to a simulation mode module 445.

One may move from the configuration mode module 444 towards module 446 to record control, function block configuration binding and connection information, and store in database which may be a RAM structure. The spreadsheet may be further populated. Here a fish (.fsh) file of module 416 (FIG. 20) may be saved and/or restored. From module 446, one may go towards module 447 where resources may be allocated to RAM, NVRAM, digital constant, and IO. Here a count may occur when something is dragged on to such as blocks, connections, tags representing outputs of blocks going from one page to another of a screen, PVID's, and so on; however, only the things that are used will use resources such as memory. Results of module 447 may go to the simulation mode 445.

The module 447 output may also go to module 448 where a tool storage file record is created and transferred to a file. An example may be a save to the .fsh file. The output from module 448 may go to the simulation mode module 445. The simulate mode may create PVID's from scratch and their assignments, find inputs, outputs, information for and from the spreadsheet, make new arrays, create a list of outputs used just for function blocks (e.g., from an .fsn file). Then from the simulation mode 445, there may be a testing of the control design at module 449. Here IO's may be changed before testing. From the test control design module 449, one may go to module 451 to make configuration files including cfg, prm, summary and debug files. Controller downloadable files and user friendly documentation files may be made at this module.

Figure 22:
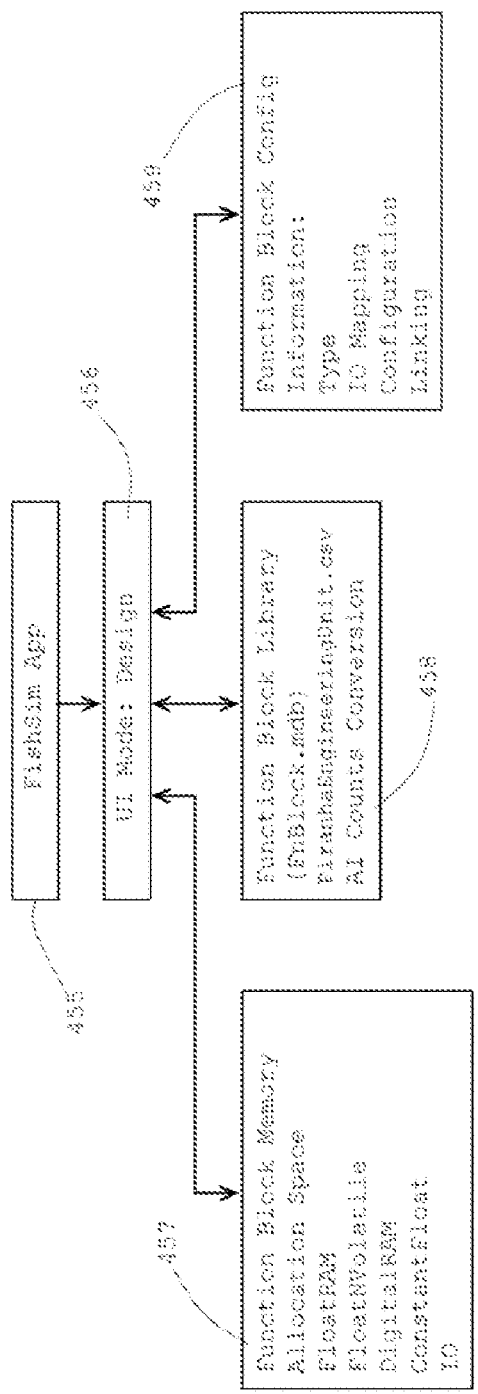
FIG. 22 is a diagram that relates to a control framework module of the compiler shown in FIG. 20.
Figure 29A:
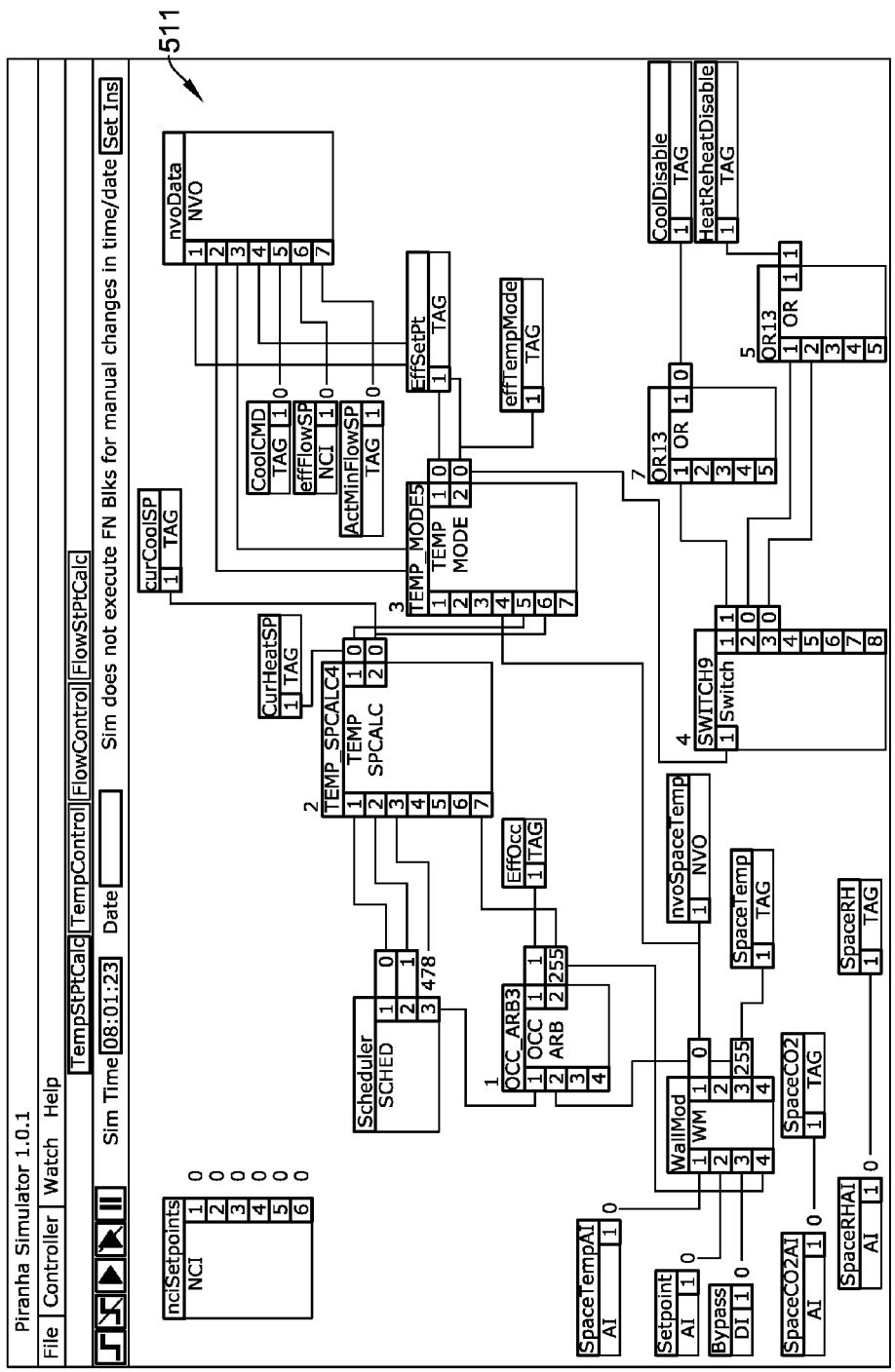
FIGS. 29a, 29b, 29c and 29d show displayed portions an example function block layout for reheat mechanism.
Figure 29B:
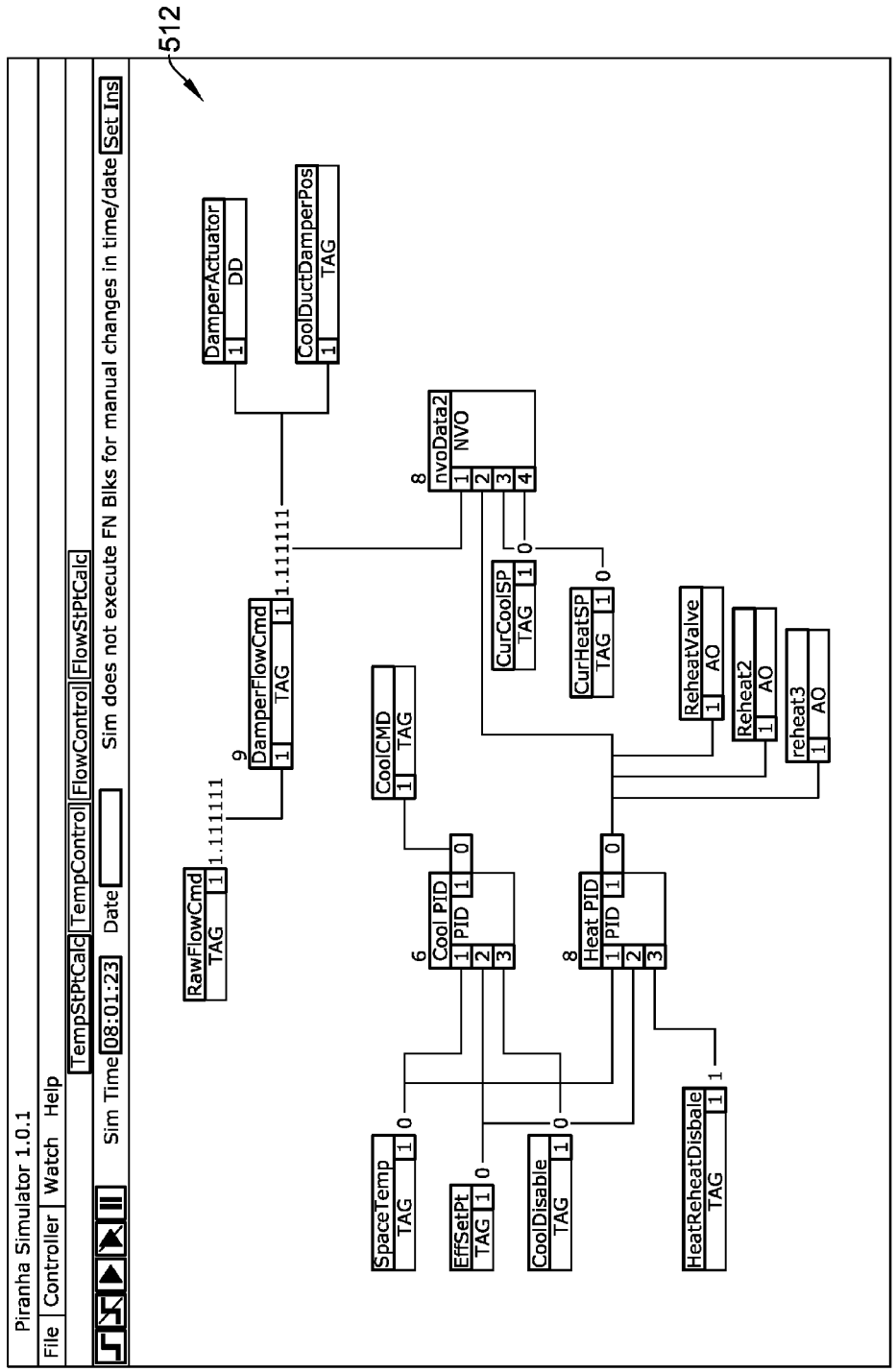
Figure 29C:
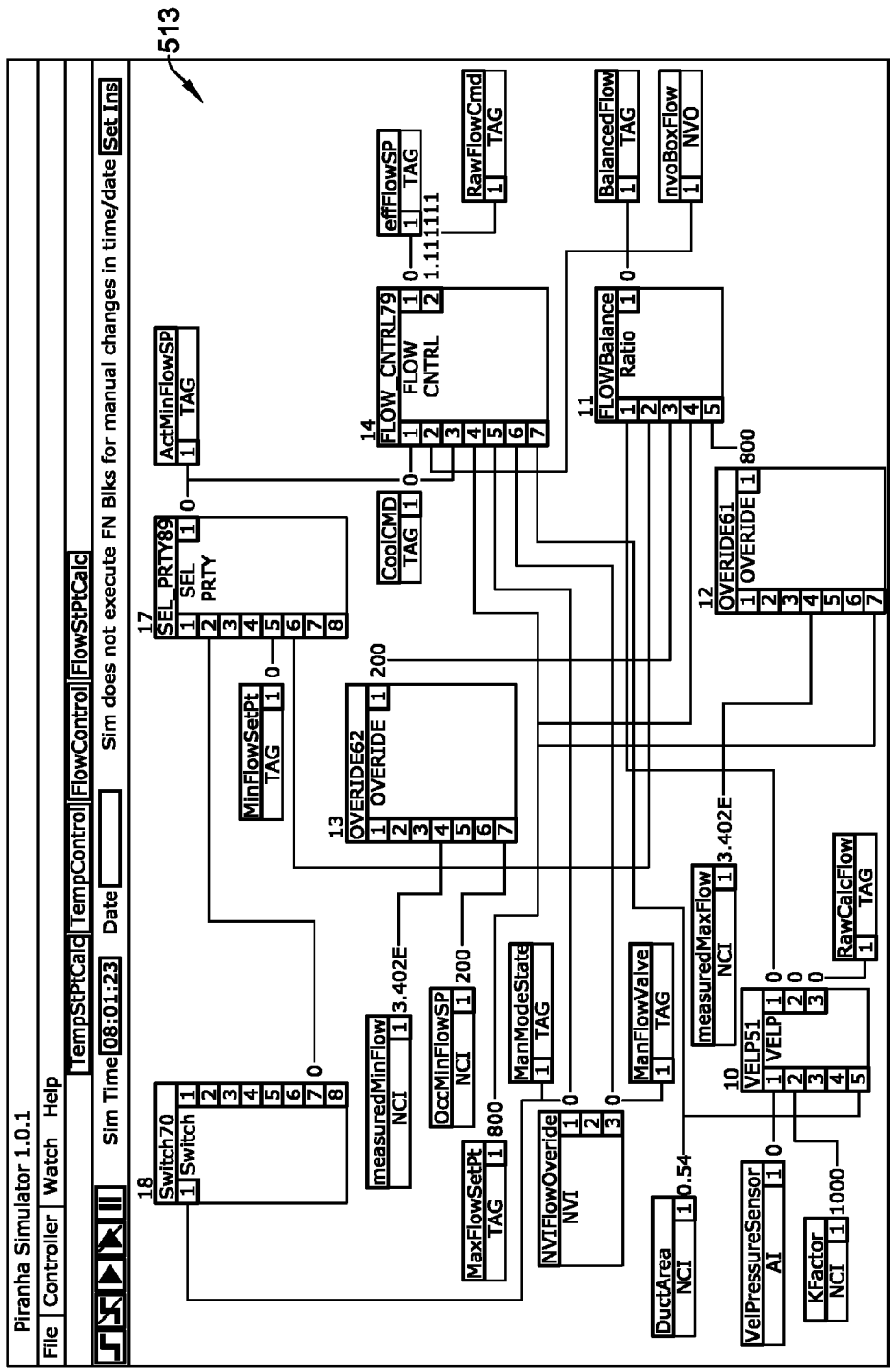
Figure 29D:
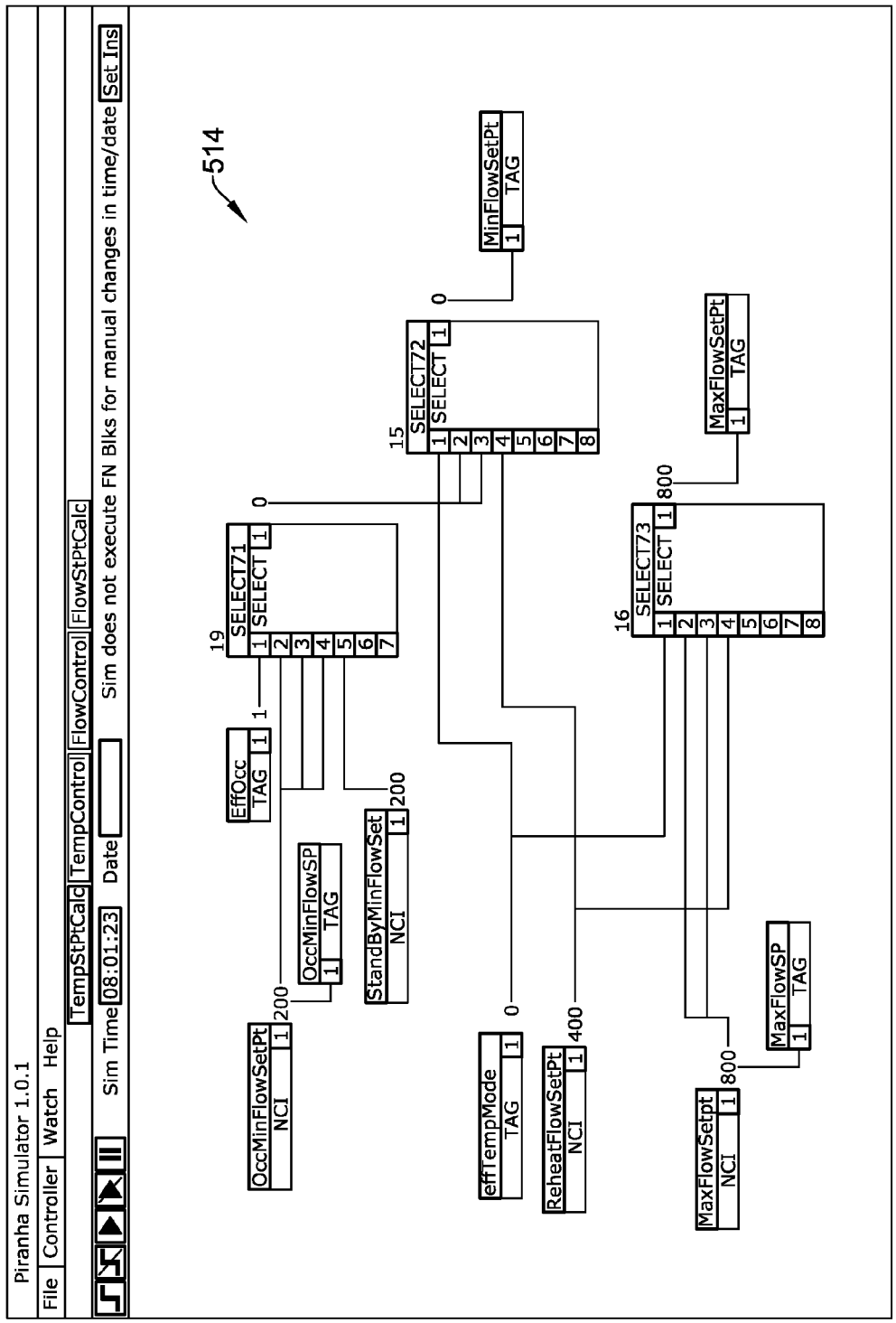

FIG. 22 is a diagram that may relate to the FishSim control framework of module 401 of FIG. 20. Module 401 may provide a replication of the real world as it relates to a function block control design. A FishSim application may be noted at module 455, which may provide an output to a user interface mode for design module 456. Here, Fish may read a function block library into a LoopDefs(i) array. A LoopDef.h file is noted in module 414 of FIG. 20. There may be a two-way interaction or connection by module 456 with a function block memory module 457. Module 457 may relate to allocation space and IO's. There may be an allocation of memory relative to float RAM (floating point values, 4 bytes, volatile storage), floating non-volatile (4 bytes), digital RAM (1 byte volatile RAM), and constant float (read only floating non-volatile storage). This allocation may relate to the allocation of resources at a sim mode as indicated in module 412 of FIG.

20. The resources may be kept track of as blocks or things are dragged on to the screen of a display of modules 411 and 410. One may work with RAM not necessarily files as files may be one time things. Information or files may be put into the RAM to work on from there.

There may be a two-way interaction or connection between module 456 and module 458 which may relate to a function block library (FnBlock.mdb) of module 413 where available function blocks may be read in as at the first step with module 441 (FIG. 21). Other information read in may include Piranha engineering unit (csv) and AI counts conversion. "csv" is a format which refers to comma separated value. It may represent a layout of the spreadsheet.

There may be a two-way connection or interaction between module 456 and module 459 concerning function block configuration information, relating to configuration mode module 444. Such information may include type, IO mapping, configuration and linking. Module 459 may include spreadsheet information.

One may drag one or more function blocks on a screen. When a function block is dragged on the screen, about 150 columns new data are treated. These data may be placed on a spreadsheet in a comma separated format (csv). An example may have a device name, loop type, function block name, work parameter values for a number of columns, word parameter IO types, IO index, byte parameter values, schedule for a number of columns, remote source output number, source block numbers, block coordinates, loop names, tag loops, execution order, and so on.

One may take a function block from a menu and place it in the screen for the circuit to be designed. There may be nine total inputs and outputs, which may be set up according to the function block. One may note that WalMod (wall module) is not a function block. It may be noted that only function blocks have or get an execution order. One may note often that only about 20 of the 80 blocks on the screens might be function blocks. Any item with a name on the list in the csv spread sheet or table is a function block. There may be type numbers in a column for both the function blocks and the non-function blocks. For instance, number 19 is a Temp_Mode function block, and numbers 130 and 131 are a scheduler and wall mod non-function blocks, respectively. Number 41 is a temp_scale, number 39 indicates overrides 61 and 62 function blocks, numbers 241 indicates several tag_out non-function blocks, and so on.

A row of a function block or other item information, in a csv format, may include a device name, mechanism or loop the device is associated with, loop type, function block name, word parameter value (0), word parameter value (1) and so on. The row may also have input and output types and index, connection information, source information, location, name of the function block or other item, a function block execution order, macro values, and so forth. This information may be typical of other rows of the csv format.

Example formats of portions of data for the present system may be shown in FIGS. 23-28. FIG. 23 shows an illustrative example of a spreadsheet 501 for data in a csv format data. FIG. 24 reveals an example of an intermediate file 502 for a function block system. FIG. 25 is an example of a summary file 503 of the spreadsheet 501. FIG. 26 is an example of a configuration (CFG) file 504. FIG. 27 is an example of a Piranha™ parameter file 505. FIG. 28 is an example of a text file 506 of Piranha™ related information.

Examples of the data shown herein relate to a reheat (VAV-ModReheat3) mechanism. An example function block layout of this mechanism may include displayed portions 511, 512, 513 and 514 which are shown in FIGS. 29a, 29b, 29c and 29d, respectively. The essentials of the layout in these Figures are noted herein.

The language compiler may take blocks, connections and so forth on the screen, converts and places the information into the tool (fishsim). The tool does pre-work or work ahead of time. The Piranha side with the function block engine is lighter and the burden is added to the tool side. The compiler is a graphical compiler that converts and moves information from the graph to the tool. The spreadsheet or table is like a chart that does not exist until saved. It is the save that creates the chart or file. The table is a direct snapshot of what is in the RAM of the graphical.

The compiling here amounts to taking graphical objects in to the parameter file and to the configure file in FLASH. The table represents current work in progress, before going into a simulate and test mode. One may design (graphical), simulate, build and download. A setpoint change for example may be saved in the memory and shown in the table.

Function blocks get converted during the present compiler process. The compiler now can take the table information and put it into download files.

A byproduct of the present approach (compiling) could be a trouble shooting tool. One may "look under the hood" at an intermediate view of what is occurring. The compiler may generate hex, e.g., 8200 in a hex file. Hex 8000 may represent floating values, 8100 for setpoints, 8200 for digital values, 8300 for fixed control constants, 9000 for analog in, 9100 for IO filtered analog in, 9200 for universal input calibration offset, 9300 for digital in, 9400 for analog out, 9500 for digital out, 9A00 for floating digital out, with other hex values for other items. Decimal equivalents might be used. The hex language may be intermediate in a compiled configuration version. One may compile a new table (after a design) to a project summary intermediate output for debugging. Then one may go to a configuration file which in a language which represents hex but is not in hex. The numbers and letters may be in an ASCII (American Standard Code for Information Interchange) string format that represents the hex configuration. This file is not necessarily executable in itself. It is not an actual code which is in the controller for execution.

The control framework 401 (FIG. 20) is for taking things on the screen. As to the list of function blocks 414, the database should be matched up with the function block code 415. The function block list should be defined before a start. A new function block may be defined with writing a code in for the block.

The end product of the compiler is a hex-like file. The network variables may be configured. A network piece may be a download. A short stack of Echelon™ may be utilized. The configuration and parameter file may have network information. There may be a network configuration file.

Niagara may have its own download file. It may be a Niagara XM filed or an XIF file. The download tool 421 may be in nodemon which may be a hex-like file. A network configuration file may be in an nm.txt file.

Configuration and parameter files are specifically for physical (i.e., real) control. A summary file (of Echelon™) may be used for debugging. The needed network tool and database may be an intermediate file. The configuration may be on the screen. In the simulate mode, a PVID is assigned. Examples are 8000 for RAM and 8200 for control digitals. A table is to an intermediate file, and to hex-like configuration files. An execution order on a control loop may be an intermediate file. There may be a parameter file and a debug file.

The present approach may involve taking the control block functionality and loading into memory structures. It appears critical that the control block functionality be defined in conjunction with the algorithm listed. The control loops structures may be instantiated in memory.

Next, the "configuration mode" may allow a control block design to be individually configured with fixed memory structures to create standard HVAC control software functionality. Next the block may be interconnected and connected in a way to perform control functions. Resource usage such as RAM, NV Ram, Digital, Constants, Setpoints, and IO may be allocated and tested against limits. The information may be encoded into a Control Block structure corresponding to the structure recorded. Additionally, a simulation and test mode can he added. The final algorithm may produce a custom configuration structure that is linked specifically to the control block. Only the needed control blocks are configured and necessary details of the files sections are created in packed structures.

An example configuration file may include the following.
07 AnalogInputLinearizatioConfigurationStore
CountsIn CountsOut
0 0 0
1 968 6594
2 1546 9786
08 AnalogInputConfigurationStore
rawUnits aiType linearizationIndex
0 2 8 255
1 18 21 255
3 19 22 0
5 20 23 255
6 2 8 255
7 2 8 255
13 UnitConfigurationStore
low high lowLim upperLimit
3 0 1 −163.84 163.83
4 0 1 −3.4E+38 3.4E+38
5 0 100 −273.17 327.66
6 32 212 −459.67 3.4E+38
14 ScalarDataTypeConfigurationStore
Scaling BaseType units
8 1 0 255
9 1 2 255
10 1 3 255
11 0.005 2 3
1
26 0 255 0
15 StructuredDataTypeFieldConfigrationStore
type numElem last
158 8 1 0
178 8 1 0
179 8 1 1
180 11 10
181 11 10
An example project file may include the following.
Device Name VAVModReheat3-102-h
Resource Useage
Control Floats=23
Control Digitals=14
Control NonVolatiles=16
Flash Constants=6
Bytes RAM pool Used=194
Bytes Loop Static=34
Function Blocks=20
User NVIs=14
User NVOs=10
Function Block Data
Type Name
OCC_ARB OCC_ARB3
Wrd Name PVID(hex) PVID(dec) Value
0 schedCurrentState 8201 33281 0
1 wmOverride 8202 33282 0
2 networkManOcc 0000 00000 0
3 occSensorState 0000 00000 0
4 effOccCurrentState 8205 33285 0
5 mauOverrideState 8200 33280 0
6 unused1 0000 00000 0
7 unused2 0000 00000 0
8 unused3 0000 00000 0
Byt Name Value
0 netLastInWins 0
1 occSensorOper 0
2 spare 0
Type Name
TEMP_SPCALC TEMP_SPCALC4
Wrd Name PVID(hex) PVID(dec) Value
0 effOccCurrentState 8201 33281 0
1 schedNextState 8203 33283 0
2 schedTuncos 8001 32769 0
3 setpoint 0000 00000 0
4 heatRampRate 0000 00000 0
5 coolRampRate 0000 00000 0
6 manOverridestate 8200 33280 0
7 effHeatSP 8003 32771 0
8 effCoolSP 8004 32772 0
Byt Name Value
0 0
1 0
2 spare 0
\
Type Name
SWITCH SWITCH70
Wrd Name PVID(hex) PVID(dec) Value
0 sensor 820C 33292 0
1 out0 0000 00000 0
2 out1 0000 00000 0
3 out2 0000 00000 0
4 out3 0000 0~000
5 out4 0000 00000 0
6 out5 0000 00000 0
7 out6 820D 33293 0
8 out7 0000 00000 0
Byt Name Value
0 offset 0
1 negout 0
2 spare 0
Type Name
SELECT SELECT71
Wrd Name PVID(hex) PVID(dec) Value
0x 8205 33285 0
1 inputDefault 810C 33036 0
2 input0 810C 33036 0
3 input1 8300 33536 0
4 input2 810C 33036 0
5 input3 810E 33038 0
6 input4 0000 00000 0
7 input5 0000 00000 0
8 output 8012 32786 0
Byt Name Value
0 offset 0
1 0
2 spare 0
Type Name
OVERIDE OVERIDE92
Wrd Name PVID(hex) PVID(dec) Value
0 priority1val0000 00000 0

```
1 priority2val 8016 32790 0
2 priority3val 9001 36865 0
3 priority4val 0000 00000 0
4 priority5val 0000 00000 0
5 priority6val 0000 00000 0
6 cntrlInput 0000 00000 0
7 defaultValue 8304 33540 90
8 effOutput 8000 32768 0
Byt Name Value
0 0
1 0
2 spare 0
User NV Configuration Data
NV Name Field Name PVID(hex) PVID(dec) Value
nciSetpoints occupied_cool 8100 33024 76
nciSetpoints standby_cool 8101 33025 78
nciSetpoints unoccupied_cool 8102 33026 80
nciSetpoints occupied_heat 8103 33027 72
nciSetpoints standby_heat 8104 33028 70
nciSetpoints unoccupied_heat 8105 33029 60
nviFlowOverride state 820C 33292 0
nviFlowOverride percent 0 0 0
nviFlowOverride flow 800E 32782 0
nciKFactorCool Field1 8107 33031 1000
nciMeasMinflowC Field1 810A 33034 3.4028233+38
nciMeasMaxFlowC Field1 8109 33033 3.4028233+38
nciDuctAreaCool Field1 8108 33032 0.54
nciOccMinFtowCSP Field1 810C 33036 200
nciStbyMinFlowSP Field1 810E 33038 200
nciMaxFlowCoolSP Field1 810B 33035 800
nciReheatFlowSP Field1 810D 33037 400
nviAutoOffsetC Field1 820A 33290 0
nviClearOffsetC Field1 820B 33291 0
nciRef Field1 0 0 0
nciRef Field2 810F 33039 0
nviSpaceTemp Field1 8016 32790 0
uvoBoxFlowCool Field1 800D 32781 N/A
nvoVelSenPressC Field1 8009 32777 N/A
nvoEffectSetpt Field1 8005 32773 N/A
nvoEffectOccup Field1 8205 33285 N/A
nvoSpaceTemp Field1 8002 32770 N/A
nvoEffectFlowCSP Field1 800F 32783 N/A
nvoCmdCoolDmpPos Field1 8006 32774 N/A
nvoReheatPos Field1 8008 32776 N/A
nvoUnitStatus mode 8204 33284 N/A
nvoUnitStatus heat_output_prim 8008 32776 N/A
nvoUnitStatus heat_ouptu_secon 810F 33039 N/A
nvoUnitStatus cool_output 8011 32785 N/A
nvoUnitStutus econ_output 810F 33039 N/A
nvoUnitStatus fan_output 810F 33039 N/A
nvoUnitStatus in_alarm 810F 33039 N/A
nvoPressOffsetC Field1 8106 33030 N/A
Control Constants
PVID(Hex) PVID(Dec) Value
8300 33536 0
8301 33537 3
8302 33538 2500
8303 33539 100
8304 33540 90
8305 33541 0
```

In the present specification, some of the matter may be of a hypothetical or prophetic nature although stated in another manner or tense.

Although the invention has been described with respect to at least one illustrative example, many variations and modifications will become apparent to those skilled in the art upon reading the present specification. It is therefore the intention that the appended claims be interpreted as broadly as possible in view of the prior art to include all such variations and modifications.

What is claimed is:

1. A control system language compiler method comprising:
    loading control functions into a memory associated with the control system language compiler;
    initiating a control loop design structure; and
    instantiating the control loop design structure; and
    configuring a circuit or structure designed using the control loop design structure to operate using a function block engine to execute a function block execution list as a list of references to functions and/or data, wherein the function block engine operates within a specified amount of memory allocated in the memory of a controller;
    entering a configuration mode of the control loop design structure for designing a circuit or structure;
    designing a circuit or structure which includes dragging function and/or non-function blocks onto a display screen; and
    connecting the function and/or non-function blocks to effect a design of the circuit or structure.

2. The method of claim 1, further comprising compiling graphical information of the design of the circuit or structure into information in a non-graphical format.

3. The method of claim 2, wherein the non-graphical format is a comma separated value format.

4. The method of claim 2, further comprising allocating memory resources for the information in the non-graphical format.

5. The method of claim 4, further comprising:
    providing a tool storage file; and
    storing the information of the non-graphical format in the tool storage file.

6. The method of claim 5, further comprising:
    entering a simulation mode for testing the design of the circuit or structure; and
    making configuration, parameter, summary and/or debug files.

7. The method of claim 1, further comprising compiling graphical information of the design into a configuration file.

8. A system comprising:
    a controller having a fixed amount memory and comprising a function block engine; and
    a computer comprising a graphical compiler module, the graphical compiler module configured to output a function block execution list used by the function block engine; and
    wherein:
    the function block execution list includes a listing of one or more references to function blocks and an order of execution of the function blocks by the function block engine;
    entering a configuration mode of the control loop design structure is for designing a circuit or structure;
    designing a circuit or structure includes dragging function and/or non-function blocks onto a display screen; and
    connecting the function and/or non-function blocks effects a design of the circuit or structure.

9. The system of claim 8, further comprising a function block allocation resources module connected to the function block engine and the graphical compiler module.

10. The system of claim 8, further comprising a function block execution list module connected to the graphical compiler module.

11. The system of claim 8, further comprising a user interface connected to the graphical compiler module.

12. The system of claim 8, wherein the graphical compiler module comprises converting graphical information into non-graphical information.

13. A method comprising:
initiating a graphical compiler module structure;
configuring function blocks, parameters, interconnects for the graphical compiler module;
activating a memory resource module; and
generating configuration information for the function blocks;
generating a function block execution list from the configured graphical compiler module;
executing the function block execution list by a function block engine using the configuration information within a specified amount of memory allocated in random access memory (RAM) of an embedded controller;
entering a configuration mode of the control loop design structure for designing a circuit or structure;
designing a circuit or structure which includes dragging function and/or non-function blocks onto a display screen; and
connecting the function and/or non-function blocks to effect a design of the circuit or structure.

14. The method of claim 13, further comprising generating configuration information for non-function blocks.

15. The method of claim 14, further comprising translating graphical design information into function blocks configuration information.

16. The method of claim 15, further comprising translating graphical design information into non-function block configuration information.

17. The method of claim 16, further comprising converting the function block and non-function block configuration information into an intermediate format.

18. The method of claim 17, wherein the intermediate format is a comma separated value format.

19. The method of claim 13, wherein a specified amount of random access memory (RAM) is about 1 kilobyte.

* * * * *